United States Patent
Kumazaki et al.

(10) Patent No.: US 8,052,570 B2
(45) Date of Patent: Nov. 8, 2011

(54) CONTROL DEVICE FOR VEHICULAR POWER TRANSMITTING APPARATUS

(75) Inventors: Kenta Kumazaki, Toyota (JP); Tooru Matsubara, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 459 days.

(21) Appl. No.: 12/230,764

(22) Filed: Sep. 4, 2008

(65) Prior Publication Data

US 2009/0075779 A1    Mar. 19, 2009

(30) Foreign Application Priority Data

Sep. 14, 2007    (JP) .................... 2007-238974

(51) Int. Cl.
B60W 10/02    (2006.01)
B60K 6/20    (2007.10)
(52) U.S. Cl. ............................ 477/5; 477/4
(58) Field of Classification Search .................. None
See application file for complete search history.

(56) References Cited

U.S. PATENT DOCUMENTS

| | | |
|---|---|---|
| 6,886,648 B1 | 5/2005 | Hata et al. |
| 2003/0075368 A1 | 4/2003 | Takaoka et al. |
| 2005/0011689 A1 | 1/2005 | Tajima et al. |
| 2005/0137042 A1 | 6/2005 | Schmidt et al. |
| 2005/0204537 A1 | 9/2005 | Reed et al. |
| 2005/0204861 A1 | 9/2005 | Reed et al. |
| 2005/0204862 A1 | 9/2005 | Reed et al. |
| 2005/0205335 A1 | 9/2005 | Reed et al. |
| 2005/0205373 A1 | 9/2005 | Foster et al. |
| 2006/0027413 A1* | 2/2006 | Tabata et al. .................. 180/305 |
| 2007/0254776 A1* | 11/2007 | Wakashiro et al. ........... 477/181 |
| 2009/0037061 A1 | 2/2009 | Tabata et al. |
| 2009/0048050 A1 | 2/2009 | Kamada et al. |

(Continued)

FOREIGN PATENT DOCUMENTS

JP    A-08-126115    5/1996

(Continued)

OTHER PUBLICATIONS

International Preliminary Report on Patentability issued in corresponding International Patent Application No. PCT/JP2006/304675 on Feb. 23, 2007 (with English-language translation).

(Continued)

*Primary Examiner* — David D Le
*Assistant Examiner* — Jacob S Scott
(74) *Attorney, Agent, or Firm* — Oliff & Berridge, PLC

(57) ABSTRACT

The present invention provides, in a vehicular power transmitting apparatus including a differential portion electrically controlled, a control device which can quickly decrease the engine rotation speed, even if the operational state of an electric motor is limited. An engine-stop controlling means (112) includes limiting means for limiting the differential state of a differential portion (11) by a switching brake (B0) and a switching clutch (C0) when the operational state of a first electric motor (M1) is limited. Therefore, a torque in a direction for decreasing a rotation speed (NE) of an engine (8) is applied by limiting the differential state of the differential portion (11), for example, in a vehicle stopped state. As a result, the rotation speed (NE) of the engine (8) is quickly decreased to pass through a resonance point in a short time, whereby occurrence of resonance phenomena can be prevented.

9 Claims, 10 Drawing Sheets

U.S. PATENT DOCUMENTS

2009/0075779 A1 3/2009 Kumazaki et al.
2009/0088290 A1 4/2009 Tabata et al.

FOREIGN PATENT DOCUMENTS

| JP | A-09-032707 | 2/1997 |
| JP | A-09-170533 | 6/1997 |
| JP | A-10-306739 | 11/1998 |
| JP | A-11-082088 | 3/1999 |
| JP | A-2000-006676 | 1/2000 |
| JP | A-2000-209706 | 7/2000 |
| JP | A-2000-316205 | 11/2000 |
| JP | A-2003-127679 | 5/2003 |
| JP | A-2003-161181 | 6/2003 |
| JP | A-2004-042834 | 2/2004 |
| JP | A-2004-076592 | 3/2004 |
| JP | A-2005-048596 | 2/2005 |
| WO | WO 2006093356 A1 * | 9/2006 |

OTHER PUBLICATIONS

International Search Report issued in International Application No. PCT/JP2006/304675 on Apr. 11, 2006 (with English-language translation).

Office Action issued in U.S. Appl. No. 11/817,726 on Dec. 2, 2009.

* cited by examiner

|  | C0 | C1 | C2 | B0 | B1 | B2 | B3 | SHIFTING RATIO | STEP |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | TOTAL 4.76 |
| R |  |  | ○ |  |  |  | ○ | 3.209 |  |
| N |  |  |  |  |  |  |  |  |  |

○ ENGAGED
◎ ENGAGED UPON STEP-VARIABLE
   RELEASED UPON CONTINUOUSLY-VARIABLE

CONTROL DEVICE FOR VEHICULAR POWER TRANSMITTING APPARATUS

TECHNICAL FIELD

This invention relates to a control device for a vehicular power transmitting apparatus. More particularly, it relates to a control technique upon stopping an internal combustion engine, in a vehicular power transmitting apparatus which includes an electric differential device functioning as an electric differential portion by controlling an operational state of an electric motor.

BACKGROUND ART

A vehicular power transmitting apparatus including an electrically controlled differential portion is known. In the electrically controlled differential portion, a differential state of rotation speeds between an input shaft to which an internal combustion engine is connected and an output shaft is controlled, by controlling an operational state of an electric motor connected to a rotary element of a differential mechanism in a power transmissive state. For example, a power output device disclosed in Patent Literature 1 (Japanese Patent Publication No. H10-306739) may be one example of such a power transmitting apparatus. In the vehicular power transmitting apparatus thus structured, the differential mechanism is comprised of, for example, a planetary gear unit having rotary elements of which rotations are controlled by controlling the electric motor connected to the rotary element in the power transmissive state.

It is well known that a torsional vibration or twisting vibration is generated in a power transmitting system by torque variations in an internal combustion engine resulting from a rotational motion thereof. The torsional vibration is amplified by a resonance phenomena of the power transmitting system, and is then transmitted to a vehicle body. Generally, a resonance area (resonance point) falls within a low rotation speed area of the internal combustion engine in which the rotation speed is less than an idle rotation speed. In a stopping process of the internal combustion engine in a differential manner, when the rotation speed falls within the resonance point, there is a fear of the above-mentioned resonance phenomena being caused. In view of this, in Patent Literature 1, upon stopping the internal combustion engine, the rotation speed thereof is controlled by controlling the electric motor to quickly pass through the resonance point, for thereby preventing occurrence of the resonance phenomena.

However, for example, if a charge/discharge of a battery supplying electric power to the motor is limited, the operational state of the electric motor is limited. If the internal combustion engine is controllably stopped by the electric motor in this state, limitation is imposed on an output torque output from the electric motor, which may lengthen a time period necessary for decreasing the rotation speed of the internal combustion engine. Thus, in a decreasing process of the rotation speed of the internal combustion engine, there is a fear that longer time period is required to pass through the resonance point, causing resonance phenomena.

SUMMARY OF THE INVENTION

The present invention is made in consideration of these circumstances, and has an object to provide a control device for a vehicular power transmitting apparatus. The vehicular power transmitting apparatus includes an electrically controlled differential portion in which a differential state between a rotation speed of an input shaft to which an internal combustion engine is connected and a rotation speed of an output shaft is controlled, by controlling an operational state of an electric motor connected to rotary element of a differential mechanism in a power transmissive state. The control device can quickly decrease an engine rotation speed even under a state where the operational state of the electric motor is limited, to thereby shorten a time period necessary for passing through a resonance point. Thus, occurrence of resonance phenomena is prevented.

For achieving the above object, a first aspect of the present invention is related to a control device for a vehicular power transmitting apparatus. The vehicular power transmitting apparatus includes (i) an electric differential portion in which, by controlling an operational state of an electric motor connected to a rotary element of a differential mechanism in a power transmissive state, a differential state between a rotation speed of an input shaft to which an internal combustion engine is connected and a rotation speed of an output shaft is controlled; and (ii) a differential state limiting means i.e. a differential state limiting portion for mechanically limiting a differential state of the electric differential portion. The control device is comprised of engine-stop controlling means i.e. an engine-stop controlling portion for decreasing a rotation speed of the internal combustion engine by the electric motor upon stopping the internal combustion engine, the engine stop controlling means including limiting means i.e. a limiting portion for limiting a differential state of the electric differential portion by the differential state limiting means when the operational state of the electric motor is limited.

A second aspect of the present invention is featured by that the differential state limiting means includes first limiting means i.e. a first limiting portion for limiting the rotation of one rotary element forming the differential mechanism; and second limiting means i.e. a second limiting portion for limiting relative rotations between two rotary elements forming the differential mechanism, and the engine-stop controlling means limiting the differential state of the electric differential portion by simultaneously using a differential limiting action by the first control means and a differential limiting action by the second limiting means.

A third aspect of the present invention is featured by that the operational state of the electric motor is limited depending on limitation imposed on charge/or discharge of a battery.

A fourth aspect of the present invention is featured by that the operational state of the electric motor is limited depending on a failed state of the electric motor.

In the control device for the vehicular power transmitting apparatus according to the first aspect of the present invention, the engine stop controlling means includes the limiting means for limiting the differential state of the electrically controlled differential portion by the differential limiting means when the operational state of the electric motor is limited. Therefore, the torque in the direction for decreasing the rotation speed of the internal combustion engine is given by limiting the differential state of the electric differential portion, for example, in the vehicle stopped state. As a result, the rotation speed of the internal combustion engine quickly decreases to pass through the resonance point in the short time. Thus, the occurrence of resonance phenomena can be prevented.

In the control device for the vehicular power transmitting apparatus according to the second aspect of the present invention, the engine stop controlling means limits the differential state of the electric differential portion by simultaneously using the differential limiting action by the first control means and differential limiting action by the second limiting means.

Thus, simultaneous using of the differential limiting actions can decrease the rotation speed of the internal combustion engine more quickly, to pass through the resonance point in the shorter time period.

In the control device for the vehicular power transmitting apparatus according to the third aspect of the present invention, the operational state of the electric motor is limited depending on the limitations imposed on the charge/discharge of the battery. Therefore, when the battery is limited in charge/discharge during the engine stop control, the output torque of the electric motor may be limited, so that the time required to decrease the rotation speed of the internal combustion engine to zero (0) is lengthened. However, the rotation speed of the internal combustion engine can be quickly decreased by limiting the differential state, to pass through the resonance point in the short time. In other words, the time period needed to pass through the resonance point can be made short.

In the control device for the vehicular power transmitting apparatus according to the fourth aspect of the present invention, the operational state of the electric motor is limited depending on the failed state of the electric motor. Therefore, when the electric motor is in the failed state during the engine stop control, the electric motor cannot be controlled, so that time required to decrease the rotation speed of the internal combustion engine to zero (0) may lengthened. However, the rotation speed of the internal combustion engine can be quickly decreased by limiting the differential state, to pass through the resonance point in the short time. In other words, the time period needed to pass through the resonance point can be made short.

BEST MODE FOR CARRYING OUT THE INVENTION

Now, various embodiments of the present invention will be described below in detail with reference to accompanying drawings.

Embodiment 1

Figures 1, 2:
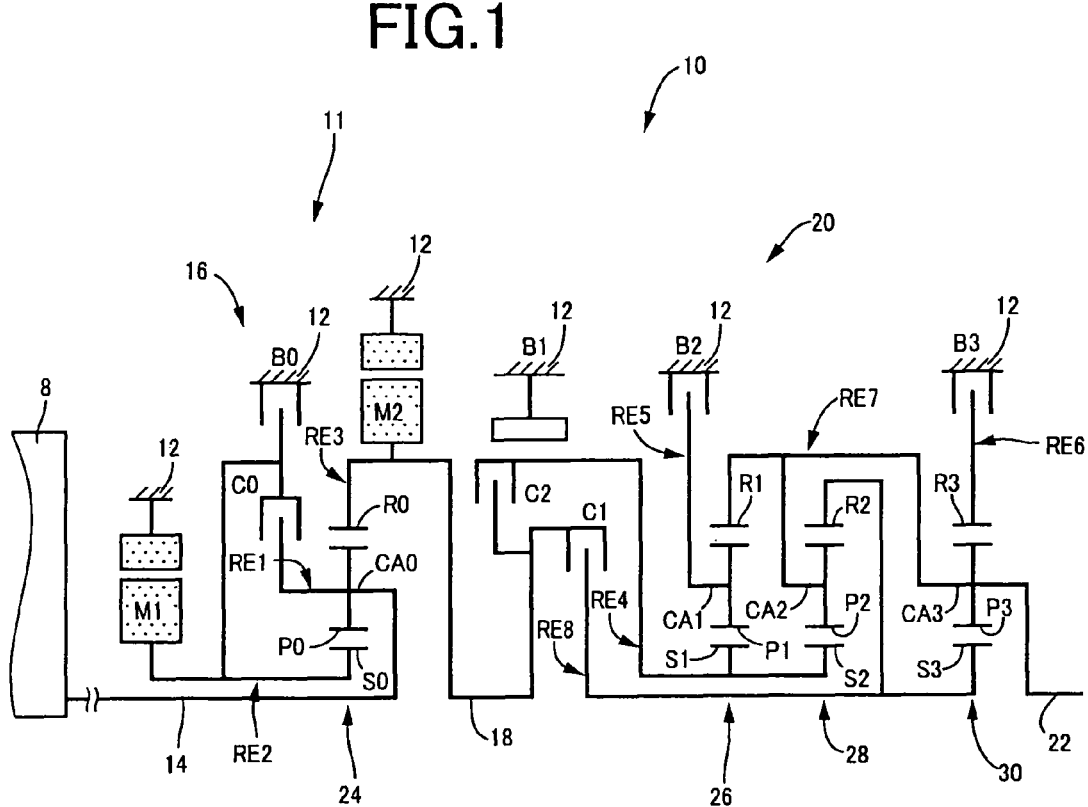
FIG. 1 is a skeleton view explaining a structure of a hybrid vehicle power transmitting apparatus which one of embodiments of the present invention.
FIG. 2 is an engagement operation table illustrating the relationship between a shifting operation, in which the hybrid vehicle power transmitting apparatus apparatus, shown in FIG. 1, is placed in a continuously variable or step-variable shifting state, and the operation of a hydraulic-type frictional engaging device in combination.

FIG. 1 is a skeleton view illustrating a shifting mechanism 10, forming part of a power transmitting apparatus for a hybrid vehicle, to which a control device of one embodiment according to the present invention is applied. As shown in FIG. 1, the shifting mechanism 10 includes an input shaft 14 serving as an input rotary member, a differential portion 11 directly connected to the input shaft 14 or indirectly connected thereto through a pulsation absorbing damper (vibration damping device) not shown, an automatic shifting portion 20 connected via a power transmitting member (corresponding to an output shaft of differential mechanism) 18 in series through a power transmitting path between the differential mechanism 11 and drive wheels 38 (see FIG. 6) to serve as a step-variable type transmission, and an output shaft 22 connected to the automatic shifting portion 20 as an output rotary member, all of which are disposed in a transmission casing 12 (hereinafter briefly referred to as a "casing 12") serving as a non-rotary member connectedly mounted on a vehicle body.

Figure 6:
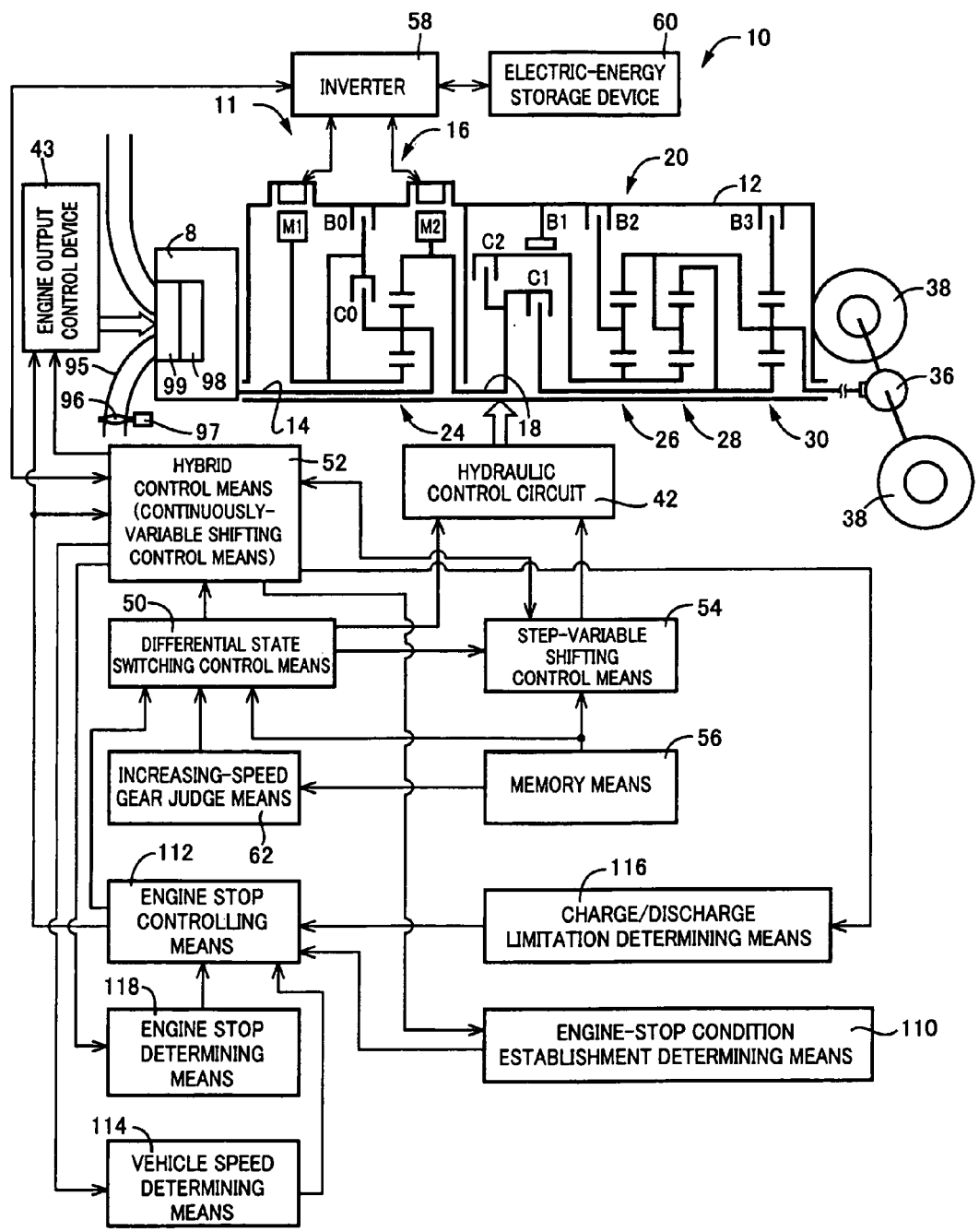
FIG. 6 is a functional block diagram illustrating a major control operation to be executed by the electronic control device shown in FIG. 4.

The shifting mechanism 10 is, preferably applicable to a vehicle of FR type (front-engine rear-drive type), disposed between a longitudinally mounted engine 8, i.e., an internal combustion engine such as a gasoline engine or a diesel engine serving as a drive force directly connected to the input shaft 14 or indirectly connected thereto via the pulsation absorbing damper, and a pair of drive wheels 38 (FIG. 6). This allows a vehicle drive force to be transmitted to the pair of drive wheels 38 on left and right in sequence through a differential gear device 36 (final speed reduction gear) and a pair of drive axles. Further, in present embodiment, the engine 8 corresponds to an internal combustion engine and the differential portion 11 corresponds to an electric differential portion of the present invention.

With the shifting mechanism 10 of the present embodiment, the engine 8 and the differential portion 11 are connected to each other in a direct connection. As used herein, the term "direct connection" may refer to a connection, established without intervening any fluid-type transmitting apparatus such as a torque converter or a fluid coupling, which involves a connection established with the use of the vibration damping device. Upper and lower halves of the shifting mechanism 10 are structured in symmetric relation with respect to an axis of the shifting mechanism 10 and, hence, the lower half is omitted in the skeleton view of FIG. 1.

The differential portion 11 can be said to be an electrically controlled differential portion in respect of an operation in which a differential state is altered using a first electric motor M1. The differential portion 11 includes a first electric motor M1, a power distributing mechanism 16 which is a mechanical mechanism to distribute the output of the engine 8 input to the input shaft 14 mechanically, and which distributes the output of the engine 8 to the first electric motor M1 and the power transmitting member 18, and a second electric motor M2 unitarily rotatable with the power transmitting member 18.

Further, the second electric motor M2 may be disposed at any portion of the power transmitting path extending from the power transmitting member 18 to the drive wheels 38. Moreover, the first and second electric motors M1 and M2 are so-called motor/generators each having a function even as an electric power generator. The first electric motor M1 has at least one function as an electric power generator that generates a reactive force, and the second electric motor M2 has at least a function as an electric motor serving as a drive force source to generate a drive force to run the vehicle.

The power distributing mechanism 16, corresponding to the differential mechanism of the present invention, mainly includes a differential-portion planetary gear unit 24 of a single pinion type having a given gear ratio ρ0 of, for instance, about "0.418", a switching clutch C0 and a switching brake B0. The differential-portion planetary gear unit 24 includes rotary elements, such as a differential-portion sun gear S0, a differential-portion planetary gears P0, a differential-portion carrier CA0 supporting the differential-portion planetary gears P0 to be rotatable about its axis and about the axis of the differential-portion sun gear S0, and a differential-portion ring gear R0 meshing with the differential-portion sun gear S0 through the differential-portion planetary gears P0. With the differential-portion sun gear S0 and the differential-portion ring gear R0 assigned to have the numbers of teeth represented by ZS0 and ZR0, respectively, the gear ratio ρ0 is expressed as ZS0/ZR0.

With the power distributing mechanism 16 of such a structure, the differential-portion carrier CA0 is connected to the input shaft 14, i.e., to the engine 8; the differential-portion sun gear S0 is connected to the first electric motor M1; and the differential-portion ring gear R0 is connected to the power transmitting member 18. The switching brake B0 is disposed between the differential-portion sun gear S0 and the casing 12, and the switching clutch C0 is disposed between the differential-portion sun gear S0 and the differential-portion carrier CA0. With both the switching clutch C0 and the switching brake B0 being disengaged, the power distributing mechanism 16 is rendered operative such that the differential-portion sun gear S0, the differential-portion carrier CA0 and the differential-portion ring gear R0, forming the three elements of the differential-portion planetary gear unit 24, are caused to rotate relative to each other to enable the operation in a differential action, i.e., in a differential state under which the differential action is effectuated.

Thus, the output of the engine 8 is distributed to the first electric motor M1 and the power transmitting member 18 with a part of the engine output distributed to the first electric motor M1 being used to generate electric energy to be stored in a battery or to drivably rotate the second electric motor M2. This renders the differential portion 11 (power distributing mechanism 16) operative as an electrically controlled differential device. Thus, the differential portion 11 is placed in a so-called continuously variable shifting state (electrically controlled CVT state), in which a rotation speed of the power transmitting member 18 varies in a continuous fashion regardless of the engine 8 operating at a given rotation speed.

That is, as the power distributing mechanism 16 is placed in the differential state, the differential portion 11 is also placed in differential state. In this casing, the differential portion 11 is placed in the continuously variable shifting state to operate as the electrically controlled continuously variable transmission with a speed ratio γ0 (a ratio of rotation speed $N_{IN}$ of the driving device input shaft 14 to the rotation speed $N_{18}$ of the power transmitting member 18) continuously varying in a value ranging from a minimum value γ0min to a maximum value γ0max. By controlling a drive state of the first electric motor M1 and the second electric motor M2 which are respectively connected to differential-portion sun gear S0 and to differential-portion ring gear R0, the differential states between the rotation speed of the input shaft 14 which connected to the engine 8 and the rotation speed of the power transmitting member 18 which operate as the output shaft are controlled. Further, in present embodiment, the power transmitting member 18 corresponds to an output shaft of the present invention.

Under such a state, as the switching clutch C0 or the switching brake B0 is engaged, the power distributing mechanism 16 is disenabled to perform the differential action, i.e., placed in a non-differential state in which no differential action is effectuated. In particular, as the switching clutch C0 to function as a locking mechanism in the present invention is engaged to cause the differential-portion sun gear S0 and the differential-portion carrier CA0 to be unitarily coupled to each other, the power distributing mechanism 16 is placed in a locked state under which the differential-portion sun gear S0, the differential-portion carrier CA0 and the differential-portion ring gear R0, serving as the three elements of the differential-portion planetary gear unit 24, are caused to rotate together, i.e., in a unitarily rotating state under the non-differential state in which no differential action is effectuated. Thus, the differential portion 11 is placed in the non-differential state. Therefore, the rotation speeds of the engine 8 and the power transmitting member 18 coincide with each other, so that the differential portion 11 (power distributing mechanism 16) is placed in a fixed shifting state, i.e., a step-variable shifting state to function as a transmission with the speed ratio γ0 connected to a value of "1".

Instead of the switching clutch C0, next, if the switching brake B0 is engaged to connect the differential-portion sun gear S0 to the casing 12, then, the power distributing mechanism 16 is placed in the locked state. Thus, the differential-portion sun gear S0 is placed in the non-rotating state under the non-differential state in which no differential action is initiated, causing the differential portion 11 to be placed in the non-differential state. Since the differential-portion ring gear R0 rotates at a speed higher than that of the differential-portion carrier CA0, the power distributing mechanism 16 functions as a speed-increasing mechanism. Thus, the differential portion 11 (power distributing mechanism 16) is placed in the fixed shifting state, i.e., the step-variable shifting state to perform a function as a speed-increasing transmission with the speed ratio γ0 connected to a value smaller than "1", i.e., for example, about 0.7.

With the present embodiment, the switching clutch C0 and the switching brake B0 selectively place the shifting state of differential portion 11 (power distributing mechanism 16) in the differential state, i.e., the unlocked state and the non-differential state, i.e., the locked state. That is, the switching clutch C0 and the switching brake B0 serves as a differential state switching device that selectively switches the differential portion 11 (power distributing mechanism 16) in one of: the continuously variable shifting state, operative to perform the electrically and continuously controlled variable shifting operation, under which the differential portion 11 (power distributing mechanism 16) is placed in the differential state (coupled state) to perform the function as the electrically controlled differential device operative to function as the continuously variable transmission with, for instance, the shifting ratio is continuously variable; and the fixed shifting state under which the differential portion 11 (power distributing mechanism 16) is placed in the shifting state, disenabling the function of the electrically controlled continuously variable shifting operation, such as the locked state disenabling the function of the continuously variable transmission in which no continuously variable shifting operation is effectuated with a speed ratio being locked at a connected level. In the locked state, the differential portion 11 (power distributing mechanism 16) is rendered operative as a transmission of a single-stage or a multi-stage with a speed ratio of one kind or speed ratios of more than two kinds to function in the fixed shifting state (non-differential state), disenabling the electrically controlled continuously variable shifting operation, under which the differential portion 11 (power distributing mechanism 16) operates as the transmission of the single-stage or the multi-stage with the speed ratio kept at a connected level.

The automatic shifting portion 20 structures a part of a power transmitting path between the differential portion 11 and the drive wheels 38, and includes a first planetary gear unit 26 of a single-pinion type, a second planetary gear unit 28 of a single-pinion type and a third planetary gear unit 30 of a single-pinion type. The first planetary gear unit 26 includes a first sun gear S1, first planetary gears P1, a first carrier CA1 supporting the first planetary gears P1 to be rotatable about its axis and about the axis of the first sun gear S1, and a first ring gear R1 meshing with the first sun gear S1 via the first planetary gears P1, having a gear ratio ρ1 of, for instance, about "0.562". The second planetary gear unit 28 includes a second sun gear S2, second planetary gears P2, a second carrier CA2 supporting the second planetary gears P2 to be rotatable about its axis and about the axis of the second sun gear S2, and a second ring gear R2 meshing with the second sun gear S2 via the second planetary gears P2, having a gear ratio ρ2 of, for instance, about "0.425".

The third planetary gear unit 30 includes a third sun gear S3, third planetary gears P3, a third carrier CA3 supporting the third planetary gears P3 to be rotatable about its axis and about the axis of the third sun gear S3, and the third ring gear R3 meshing with the third sun gear S3 through the third planetary gears P3, having a gear ratio ρ3 of, for instance, about "0.421". With the first sun gear S1, the first ring gear R1, the second sun gear S2, the second ring gear R2, the third sun gear S3 and the third ring gear R3 assigned to have the numbers of teeth represented by ZS1, ZR1, ZS2, ZR2, ZS3 and ZR3, respectively, the gear ratios ρ1, ρ2 and ρ3 are represented by ZS1/ZR1, ZS2/ZR2, and ZS3/ZR3, respectively.

With the automatic shifting portion 20, the first sun gear S1 and the second sun gear S2 are integrally connected to each other and selectively connected to the power transmitting member 18 through a second clutch C2 while selectively connected to the casing 12 through a first brake B1. The first carrier CA1 is selectively connected to the casing 12 through a second brake B2 and the third ring gear R3 is selectively connected to the casing 12 through a third brake B3. The first ring gear R1, the second carrier CA2 and the third carrier CA3 are integrally connected to each other and also connected to the output shaft 22. The second ring gear R2 and the third sun gear S3 are integrally connected to each other and selectively connected to the power transmitting member 18 through the first clutch C1.

Thus, the automatic shifting portion 20 and the power transmitting member 18 are selectively connected to each other through the first clutch C1 or the second clutch C2 used for establishing a gear shift position in the automatic shifting portion 20. In other words, the first clutch C1 and the second clutch C2 collectively function as an engaging device for switching the operations of the power transmitting member 18 and the automatic shifting portion 20. That is, such an engaging device selectively switches a power transmitting path between the differential portion 11 (transmitting member 18) and the drive wheels 38 in a power transmitting state, enabling a power transfer through the power transmission path, and a power interrupting state (neutral state) to interrupting the power transfer through the power transmission path. That is, with at least one of the first clutch C1 and the second clutch C2 being engaged, the power transmitting path is placed in the power transmitting state. In contrast, with both the first clutch C1 and the second clutch C2 being disengaged, the power transmitting path is placed in the power interrupting state (neutral state).

The switching clutch C0, the first clutch C1, the second clutch C2, the switching brake B0, the first brake B1, the second brake B2 and the third brake B3 are hydraulic-type frictionally coupling devices used in a vehicular step-variable type automatic transmission of the related art. An example of the frictionally coupling device includes a wet-type multiple-disc type that includes a plurality of superposed friction plates pressed against each other with a hydraulic actuator or a band brake comprised of a rotary drum having an outer circumferential surface on which one band or two bands are wound to be tightened at one ends with a hydraulic actuator to allow associated component parts, between which the rotary drum intervenes, to be selectively connected to each other.

With the shifting mechanism 10 of such a structure, as indicated in an engagement operation table shown FIG. 2, the switching clutch C0, the first clutch C1, the second clutch C2, the switching brake B0, the first brake B1, the second brake B2 and the third brake B3 are selectively engaged in operation. This selectively establishes either one of a 1st-speed gear position (1st-speed gear shift position) to a 5th-speed gear position (5th-speed gear shift position) or one of a reverse-drive gear position (reverse-drive gear shift position) and a neural position with a speed ratios γ (input-shaft rotation speed $N_{IN}$/output-shaft rotation speed $N_{OUT}$) varying in nearly equal ratio for each gear position.

In particular, with the present embodiment, the power distributing mechanism 16 is comprised of the switching clutch C0 and the switching brake B0, either one of which is engaged in operation. This makes it possible to cause the differential portion 11 to be placed in the continuously variable shifting state enabling the operation as the continuously variable transmission while establishing the fixed shifting state enabling the transmission to operate with the speed ratio maintained at a fixed level. With either one of the switching clutch C0 and the switching brake B0 being engaged in operation, accordingly, the differential portion 11 is placed in the fixed shifting state to cooperate with the automatic shifting portion 20 to allow the shifting mechanism 10 to operate as the step-variable transmission placed in the step-variable shifting state.

With both of the switching clutch C0 and the switching brake B0 being disengaged in operation, the differential portion 11 is placed in the continuously variable shifting state to cooperate with the automatic shifting portion 20 to allow the shifting mechanism 10 to operate as the electrically controlled continuously variable transmission placed in the continuously variable shifting state. In other words, the shifting mechanism 10 is switched to the step-variable shifting state, upon engagement of either one of the switching clutch C0 and the switching brake B0, and the continuously variable shifting state with both of the switching clutch C0 and the switching brake B0 being brought into disengagement. In addition, it can be said that the differential portion 11 is the transmission that can also be switched to the step-variable shifting state and the continuously variable shifting state.

For example, as shown in FIG. 2, under a circumstance where the shifting mechanism 10 is caused to function as the step-variable transmission, engaging the switching clutch C0, the first clutch C1 and the third brake B3 results in the 1st-speed gear position with the speed ratio $\gamma 1$ having a maximum value of, for instance, about "3.357". Engaging the switching clutch C0, the first clutch C1 and the second brake B2 results in the 2nd-speed gear position with the speed ratio $\gamma 2$ of, for instance, about "2.180", which is lower than that of the 1st-speed gear position. Engaging the switching clutch C0, the first clutch C1 and the first brake B1 results in the 3rd-speed gear position with the speed ratio $\gamma 3$ of, for instance, about "1.424", which is lower than that of the 2nd-speed gear position. Engaging the switching clutch C0, the first clutch C1 and the second clutch C2 results in the 4th-speed gear position with the speed ratio $\gamma 4$ of, for instance, about "1.000", which is lower than that of the 3rd-speed gear position.

With the first clutch C1, the second clutch C2 and the switching brake B0 being engaged, the 5th-speed gear position is established with the speed ratio $\gamma 5$ of, for example, about "0.705", which is smaller than that of the 4th-speed gear position. With the second clutch C2 and the third brake B3 being engaged, further, the reverse-drive gear position is established with the speed ratio $\gamma R$ of, for example, about "3.209", which lies at a value between those of the 1st-speed and 2nd-speed gear positions. For the neutral "N" state to be established, for instance, all the clutches and the brakes C0, C1, C2, B0, B1, B2 and B3 are disengaged.

However, for the shifting mechanism 10 to function as the continuously variable transmission, both the switching clutch C0 and the switching brake B0 are disengaged as indicated in the engagement operation table shown in FIG. 2. With such operation, the differential portion 11 is rendered operative to function as the continuously variable transmission and the automatic shifting portion 20, connected thereto in series, is rendered operative to function as the step-variable transmission. This causes the rotation speed input to the automatic shifting portion 20, i.e., the rotation speed of the power transmitting member 18 to be continuously varied for each of the 1st-speed gear position, the 2nd-speed gear position, the 3rd-speed gear position and the 4th-speed gear position. This allows each of the various gear positions to be established in an infinitely variable shifting ratio. Accordingly, a speed ratio can be continuously variable across the adjacent gear positions, making it possible for the shifting mechanism 10 as a whole to obtain an infinitely variable total speed ratio (overall speed ratio) $\gamma T$.

Figure 3:
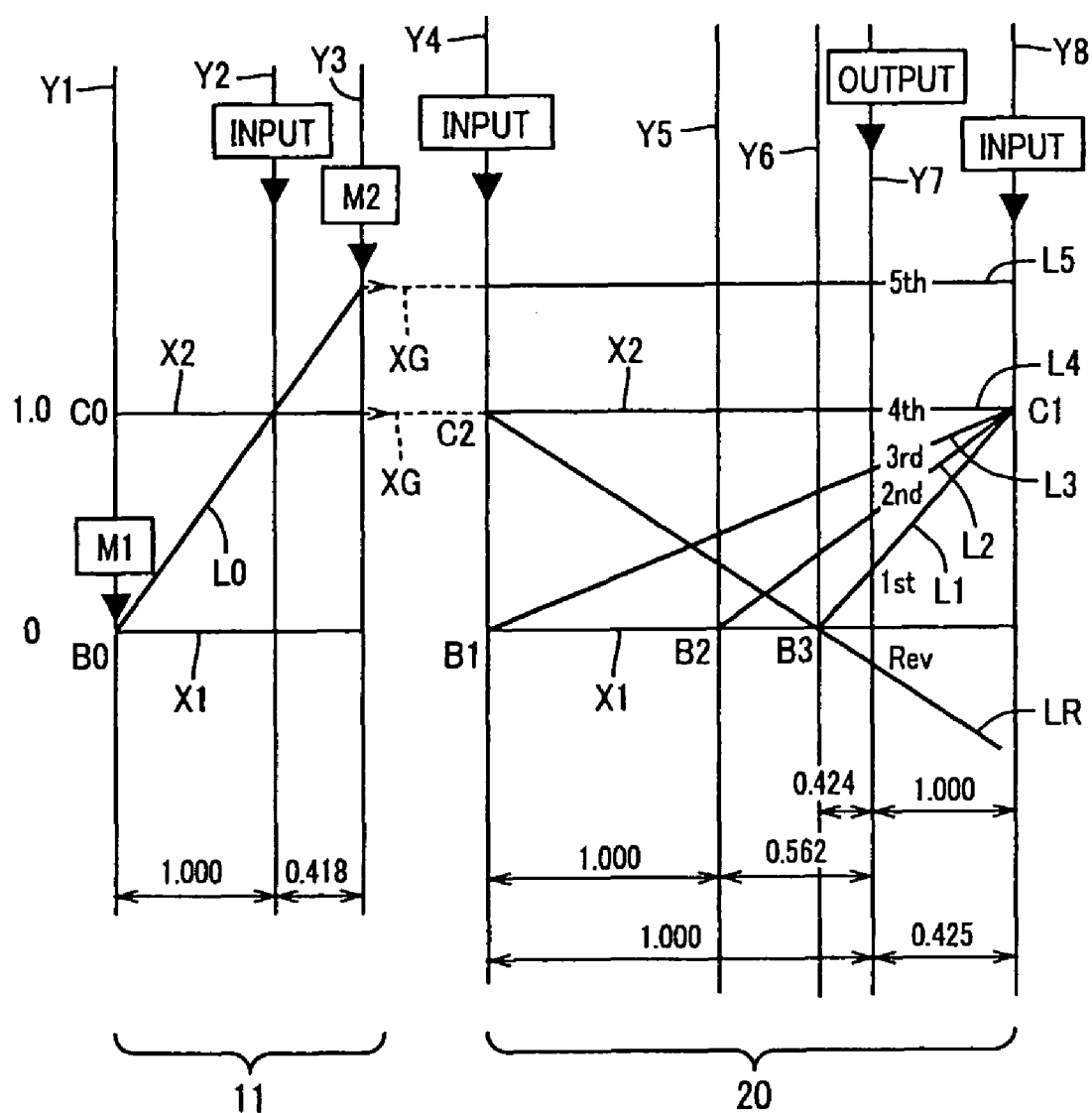
FIG. 3 is a collinear chart illustrating the relative rotation speed of rotary elements in each of different gear positions when the hybrid vehicle power transmitting apparatus, shown in FIG. 1, is caused to operate in the step-variable shifting state.

FIG. 3 shows a collinear chart plotted in straight lines that can represent a correlation among the rotation speeds of the various rotary elements available to accomplish clutch engagement states in different modes depending on the gear positions of the shifting mechanism 10 comprised of the differential portion 11, functioning as the continuously variable shifting portion or the first shifting portion, and the automatic shifting portion 20 functioning as the step-variable shifting portion or the second shifting portion. The collinear chart of FIG. 3 is a two-dimensional coordinate system having the horizontal axis, representing the correlation among the gear ratios $\gamma$ established with the planetary gear units 24, 26, 28 and 30, and the vertical axis representing relative rotation speeds of the rotary elements. The lowermost line X1 of three horizontal lines indicates the rotation speed laying at a value of "0". An upper horizontal line X2 indicates the rotation speed laying at a value of "1.0", that is, a rotation speed NE of the engine 8 connected to the input shaft 14. The uppermost horizontal line XG indicates the rotation speed of the power transmitting member 18.

Starting from the left, three vertical lines Y1, Y2 and Y3, corresponding to the three elements of the power distributing mechanism 16 forming the differential portion 11, respectively, represent relative rotation speeds of the differential-portion sun gear S0 corresponding to a second rotary element (second element) RE2, the differential-portion carrier CA0 corresponding to a first rotary element (first element) RE1, and the differential-portion ring gear R0 corresponding to a third rotary element (third element) RE3. A distance between adjacent ones of the vertical lines Y1, Y2 and Y3 is determined in accordance with the gear ratio $\rho 0$ of the differential-portion planetary gear unit 24.

Starting from the left, five vertical lines Y4, Y5, Y6, Y7 and Y8 for the automatic shifting portion 20 represent relative rotation speeds of the first and second sun gears S1 and S2 corresponding to a fourth rotary element (fourth element) RE4 and connected to each other, the first carrier CA1 corresponding to a fifth rotary element (fifth element) RE5, the third ring gear R3 corresponding to a sixth rotary element (sixth element) RE6, the first ring gear R1 and the second and third carriers CA2 and CA3 corresponding to a seventh rotary element (seventh element) RE7 and connected to each other, and the second ring gear R2 and the third sun gear S3 corresponding to an eighth rotary element (eighth element) RE8 and connected to each other, respectively. A distance between the adjacent ones of the vertical lines Y4 to Y8 is determined based on the gear ratios $\rho 1$, $\rho 2$ and $\rho 3$ of the first, second and third planetary gear units 26, 28 and 30.

In the correlation between the vertical lines on the collinear chart, if an interval between the sun gear and the carrier is assigned to a distance corresponding to a value of "1", an interval between the carrier and the ring gear is assigned to a distance corresponding to the gear ratio $\rho$ of the planetary gear unit. That is, for the differential portion 11, an interval between the vertical lines Y1 and Y2 is assigned to a distance corresponding to a value of "1" and an interval between the vertical lines Y2 and Y3 is assigned to a distance corresponding to a value of "$\rho 0$". For each of the first, second and third planetary gear units 26, 28 and 30 of the automatic shifting portion 20, further, an interval between the sun gear and the carrier is assigned to a distance corresponding to a value of "1" and an interval between the carrier and the ring gear is assigned to a distance corresponding to the gear ratio "ρ".

Expressing the structure using the collinear chart shown in FIG. 3, the shifting mechanism 10 of the present embodiment takes the form of a structure including the power distributing mechanism 16 (differential portion 11). With the power distributing mechanism 16, the differential-portion planetary gear unit 24 has the first rotary element RE1 (differential-portion carrier CA0) connected to the input shaft 14, i.e., the engine 8, while selectively connected to the second rotary element RE2 (differential-portion sun gear S0) through the switching clutch C0, the second rotary element RE2 connected to the first electric motor M1 while selectively connected to the casing 12 through the switching brake B0, and the third rotary element RE3 (differential-portion ring gear R0) connected to the power transmitting member 18 and the second electric motor M2. Thus, the rotation of the input shaft 14 is transmitted (input) to the automatic shifting portion (step-variable shifting portion) 20 through the power transmitting member 18. An inclined straight line L0, passing across an intersecting point between the lines Y2 and X2, represents the correlation between the rotation speeds of the differential-portion sun gear S0 and the differential-portion ring gear R0.

For example, as the switching clutch C0 and the switching brake B0 are disengaged, the shifting mechanism 10 is switched to the continuously variable shifting state (differential state). In this case, controlling the rotation speed of the first electric motor M1 causes the rotation speed of the differential-portion sun gear S0, represented by an intersecting point between the straight line L0 and the vertical line Y1, to increase or decrease. Under such a state, if the rotation speed of the differential-portion ring gear R0, bound with the vehicle speed V, remains at a nearly fixed level, then, the rotation speed of the differential-portion carrier CA0, represented by the intersecting point between the straight line L0 and the vertical line Y2, is caused to increase or decrease.

With the switching clutch C0 being engaged to couple the differential-portion sun gear S0 and the differential-portion carrier CA0 to each other, the power distributing mechanism 16 is brought into the non-differential state where the three rotary elements are caused to integrally rotate as a unitary unit. Thus, the straight line L0 matches the lateral line X2, so that the power transmitting member 18 is caused to rotate at the same rotation speed as the engine rotation speed NE. In contrast, with the switching brake B0 being engaged to halt the rotation of the differential-portion sun gear S0, the power distributing mechanism 16 is brought into the non-differential state to function as the speed-increasing mechanism. Thus, the straight line L0 describes a state as shown in FIG. 3, under which the rotation of the differential-portion ring gear R0, i.e., the power transmitting member 18, represented by an intersecting point between the straight line L0 and the vertical line Y3, is input to the automatic shifting portion 20 at a rotation speed higher than the engine rotation speed NE.

With the automatic shifting portion 20, the fourth rotary element RE4 is selectively connected to the power transmitting member 18 through the second clutch C2 and selectively connected to the casing 12 through the first brake B1. The fifth rotary element RE5 is selectively connected to the casing 12 through the second brake B2 and the sixth rotary element RE6 is selectively connected to the casing 12 through the third brake B3. The seventh rotary element RE7 is connected to the output shaft 22 and the eighth rotary element RE8 is selectively connected to the power transmitting member 18 through the first clutch C1.

As shown in FIG. 3, with the automatic shifting portion 20, upon engagement of the first clutch C1 and the third brake B3, the rotation speed of the output shaft 22 for the 1st-speed gear position is represented by an intersecting point between the inclined straight line L1 and the vertical line Y7 representing the rotation speed of the seventh rotary element RE7 connected to the output shaft 22. Here, the inclined straight line L1 passes across an intersecting point between the vertical line Y8, indicative of the rotation speed of the eighth rotary element RE8, and the horizontal line X2, and an intersecting point between the vertical line Y6, indicative of the rotation speed of the sixth rotary element RE6, and the horizontal line X1.

Similarly, the rotation speed of the output shaft 22 for the 2nd-speed gear position is represented by an intersecting point between an inclined straight line L2, determined upon engagement of the first clutch C1 and the second brake B2, and the vertical line Y7 indicative of the rotation speed of the seventh rotary element RE7 connected to the output shaft 22. The rotation speed of the output shaft 22 for the 3rd-speed gear position is represented by an intersecting point between an inclined straight line L3, determined upon engagement of the first clutch C1 and the first brake B1, and the vertical line Y7 indicative of the rotation speed of the seventh rotary element RE7 connected to the output shaft 22. The rotation speed of the output shaft 22 for the 4th-speed gear position is represented by an intersecting point between a horizontal line L4, determined upon engagement of the first and second clutches C1 and C2, and the vertical line Y7 indicative of the rotation speed of the seventh rotary element RE7 connected to the output shaft 22.

For the 1st-speed to 4th-speed gear positions, the switching clutch C0 remains engaged. Therefore, a drive force is applied from the differential portion 11, i.e., the power distributing mechanism 16 to the eighth rotary element RE8 at the same rotation speed as that of the engine rotation speed NE. However, in place of the switching clutch C0, if the switching clutch B0 is engaged, then, the drive force is applied from the differential portion 11 to the eighth rotary element RE8 at a higher rotation speed than the engine rotation speed NE. Thus, an intersecting point between a horizontal line L5 and the vertical line Y7 represents the rotation speed of the output shaft 22 for the 5th-speed gear position. Here, the horizontal line L5 is determined upon engagement of the first clutch C1, the second clutch C2 and the switching brake B0 and the vertical line Y7 represents the rotation speed of the seventh rotary element RE7 connected to the output shaft 22.

Figure 4:
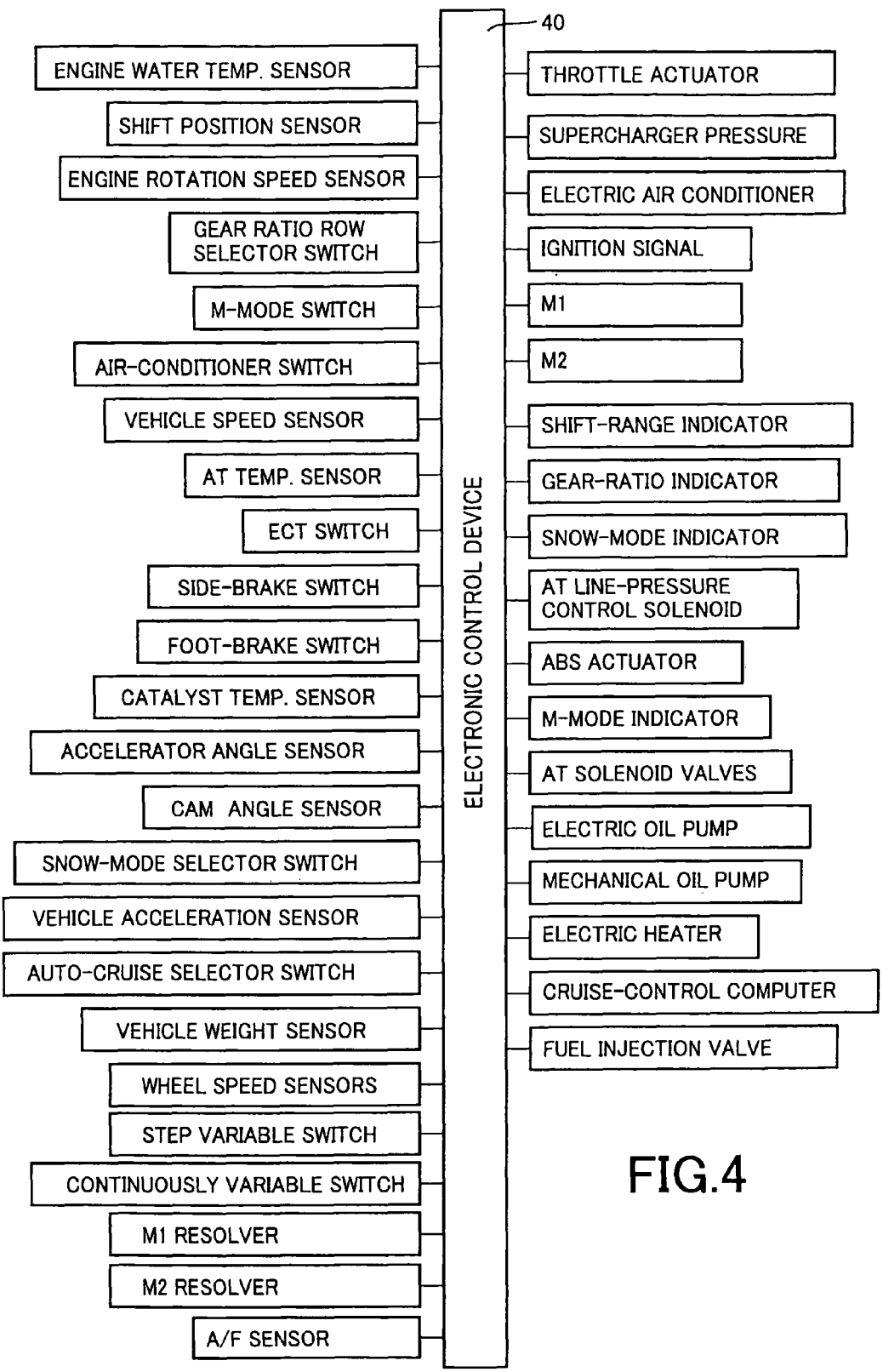
FIG. 4 is a view illustrating input and output signals to be input to or output from an electronic control device incorporated in the hybrid vehicle power transmitting apparatus shown in FIG. 1.

FIG. 4 exemplarily shows various input signals applied to an electronic control device 40, serving as a control device for controlling the shifting mechanism 10 forming part of the hybrid vehicle drive apparatus according to the present invention, and various output signals delivered from the electronic control device 40. The electronic control device 40 includes a so-called microcomputer incorporating a CPU, a ROM, a RAM and an input/output interface. With the microcomputer operated to perform signal processing according to programs preliminarily stored in the ROM while utilizing a temporary data storage function of the RAM, hybrid drive controls are conducted to control the engine 8 and the first and second electric motors M1 and M2, while executing drive controls such as shifting controls of the automatic shifting portion 20.

The electronic control device 40 is applied with the various input signals from various sensors and switches shown in FIG. 4. These input signals include a signal indicative of an engine cooling water temperature $TEMP_W$, a signal indicative of a selected shift position SP, a signal indicative of a rotation speed $N_{M1}$ of the first electric motor M1, a signal indicative of a rotation speed $N_{M2}$ of the second electric motor M2, a signal indicative of the engine rotation speed NE representing the rotation speed of the engine 8, a signal indicative of a set value of gear ratio row, a signal commanding an M-mode (manually shift drive mode), and an air-conditioning signal indicative of the operation of an air conditioner, etc.

Besides the input signals described above, the electronic control device 40 is further applied with other various input signals. These input signals include a signal indicative of the vehicle speed V corresponding to the rotation speed $N_{OUT}$ of the output shaft 22, a working oil temperature signal indicative of a working oil temperature of the automatic shifting portion 20, a signal indicative of a side brake being operated, a signal indicative of a foot brake being operated, a catalyst temperature signal indicative of a catalyst temperature, an accelerator opening signal indicative of a displacement value $A_{CC}$ of an accelerator pedal corresponding to an output demand value required by a driver, a cam angle signal, a snow mode setting signal indicative of a snow mode being set, an acceleration signal indicative of a fore and aft acceleration of the vehicle, an auto-cruising signal indicative of the vehicle running under an auto-cruising mode, a vehicle weight signal indicative of a weight of the vehicle, a drive wheel velocity signal indicative of a wheel velocity of each drive wheel, a signal indicative of an air-fuel ratio A/F of the engine 8, and a signal indicative of a throttle valve opening $\theta_{TH}$, etc.

The electronic control device 40 generates various control signals to be applied to an engine output control device 43 (refer to FIG. 6) for controlling the engine output. These control signals include, for instance, a drive signal applied to a throttle actuator 97 for controlling an opening degree $\theta_{TH}$ of a throttle valve 96 disposed in an intake manifold 95 of the engine 8, a fuel supply quantity signal to be applied to a fuel injection device 98 for controlling the amount to fuel to be supplied to each cylinder of the engine 8, an ignition signal to be applied to an ignition device 99 for commanding an ignition timing of the engine 8, a supercharger pressure regulating signal for adjusting a supercharger pressure level, an electric air-conditioner drive signal for actuating an electric air conditioner, and command signals for commanding the operations of the first and second electric motors M1 and M2.

Besides the control signals described above, the electronic control device 40 generates various output signals. These output signals include a shift-position (selected operating position) display signal for activating a shift indicator, a gear-ratio display signal for providing a display of the gear ratio, a snow-mode display signal for providing a display of a snow mode under operation, an ABS actuation signal for actuating an ABS actuator for preventing slippages of the drive wheels during a braking effect, an M-mode display signal for displaying the M-mode being selected, valve command signals for actuating electromagnet valves incorporated in a hydraulically operated control circuit 42 (see FIG. 6) to control the hydraulic actuators of the hydraulically operated frictional engaging devices of the differential portion 11 and the automatic shifting portion 20, drive command signals for actuating an electric hydraulic pump serving as a hydraulic pressure source of the hydraulically operated control circuit 42, a signal for driving an electric heater, and signals applied to a cruise-control computer, etc.

Figure 5:
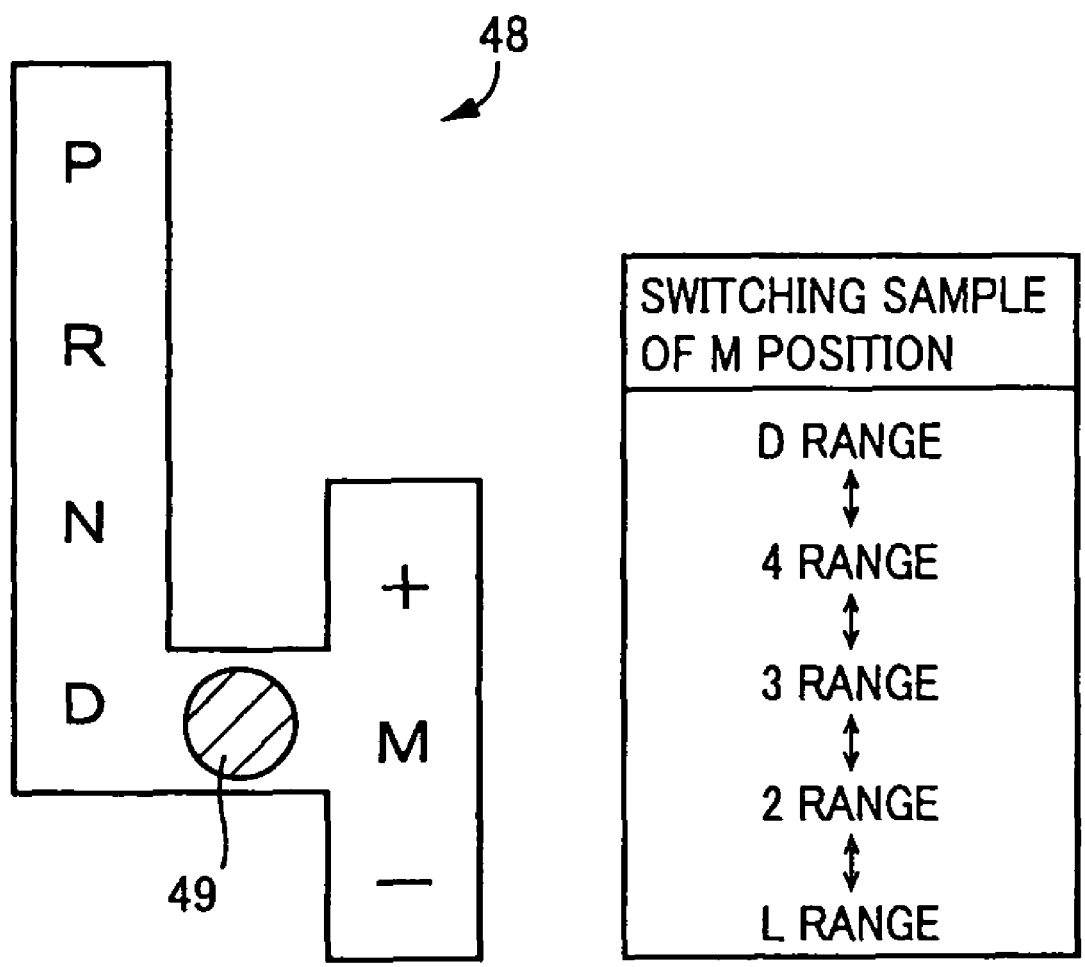
FIG. 5 is a view showing one sample of a shift operating device for operating to select one of plural kinds of shift positions which is manually operated.

FIG. 5 is a view showing one sample of a shift operating device 48, serving as a switching device, which is manually operated to select one of the shift positions SP of multiple kinds. The shift operating device 48 includes a shift lever 49 mounted aside, for example, a driver's seat to be manually operated to select one of the shifting positions SP of the plural kinds.

The shift lever 49 has a structure arranged to be selectively shifted in manual operation to be set to one of a parking position "P" (Parking) under which the shifting mechanism 10, i.e., the automatic shifting portion 20, is placed in the neutral state interrupting the power transmitting path of the shifting mechanism 10, i.e., the automatic shifting portion 20, a reverse drive running position "R" (Reverse) for the vehicle to run in a reverse drive mode, a neutral position "N" (Neutral) for the neutral state to be established under which the power transmitting path of the shifting mechanism 10 is interrupted, a forward drive automatic shift position "D" (Drive) for an automatic shift control to be executed within a varying range of the total speed ratio γT that can be shifted with the shifting mechanism 10, and a forward drive manual shift position "M" (Manual) under which a manual shift running mode (manual mode) is established to set a so-called shift range that limits the shift gear positions in a high speed range during the execution of the automatic shift control.

In conjunction with the shift lever 49 being manually operated to each of the shift positions SP, for instance, the hydraulic control circuit 42 is electrically switched in such a way to establish each of the gear shift positions such as the reverse drive position "R", the neutral position "N" and the forward drive position "D" as shown in the engagement operation table shown in FIG. 2.

Among the various shift positions SP covering "P" to "M" positions, the "P" and "N" positions represent the non-running positions selected when no intension is present to run the vehicle. For the "P" and "N" positions to be selected, both the first and second clutches C1 and C2 are disengaged, as shown in, for example, the engagement operation table of FIG. 2, and non-drive positions are selected to place the power transmitting path in the power cutoff state. This causes the power transmitting path of the automatic shifting portion 20 to be interrupted, disenabling the vehicle to be driven.

The "R", "D" and "M" positions represent running positions selected when the vehicle is caused to run. These shift positions also represent drive positions selected when switching the power transmitting path to the power transmitting state under which at least one of the first and second clutches C1 and C2 is engaged as shown in, for instance, the engagement operation table of FIG. 2. With such shifting positions are selected, the power transmitting path of the automatic shifting portion 20 is connected to enable the vehicle to be driven.

More particularly, with the shift lever 49 manually operated from the "P" position or the "N" position to the "R" position, the second clutch C2 is engaged so that the power transmitting path of the automatic shifting portion 20 is switched from the power cutoff state (neutral state) to the power transmitting state. With the shift lever 49 manually operated from the "N" position to the "D" position, at least the first clutch C1 is engaged, causing the power transmitting path of the automatic shifting portion 20 to be switched from the power cutoff state to the power transmitting state.

With the shift lever 49 manually operated from the "R" position to the "P" position or the "N" position, the second clutch C2 is disengaged, causing the power transmitting path of the automatic shifting portion 20 to be switched from the power transmitting state to the power cutoff state. With the shift lever 49 manually operated from the "D" position to the "N" position, the first and second clutches C1 and C2 are disengaged, causing the power transmitting path of the automatic shifting portion 20 to be switched from the power transmitting state to the power cutoff state.

The "M" position is located at the same position as the "D" position in the longitudinal direction of the vehicle, and is adjacent thereto in the lateral direction of the same. The shift lever 49 is operated to the "M" position, for manually selecting one of the above-indicated "D" through "L" positions. Specifically, for the "M" position, an upshift position "+" and a downshift position "−" are provided in the front-rear direction of the vehicle. The shift lever 49 is manipulated to the upshift position "+" and the downshift position "−" to select any of the "D" range to the "L" range.

For example, the five shifting ranges of the "D" range to the "L" range selected at the "M" position correspond to, in the changeable range of the overall speed ratio γT which can control the shifting mechanism 10 automatically, different kinds of shifting ranges in which the overall speed ratio γT at higher speed side (minimum gear ratio side) are different. Also, these five shifting ranges limit the shifting range i.e., scope of the shifting position (gear position) so that the maximum side shifting position which can control the shifting of the automatic shifting portion 20 is different. The shift lever 49 is urged by urge means such as a spring from the upshift position "+" and the downshift position "−" to be automatically returned to the "M" position. In addition, the shift operation device 48 is provided with a shift position sensor (not shown) for detecting each of the shift positions of the shift lever 49, to output a signal representing the shift position of the shift lever 48, and the number of manipulation at the "M" position to the electronic control device 40.

When the "M" position is selected by manipulation of the shift lever 49, the automatic shift control is executed within the total speed ratio γT in which the shifting mechanism 10 can be shifted in each of the shifting ranges thereof, so as not to exceed the highest speed side shifting position or the shifting ratio of the shifting range. For example, in the step variable shifting running in which the shifting mechanism 10 is switched to the step variable shifting state, the automatic shift control is executed within the total speed ratio γT in which the shifting mechanism 10 can be shifted in each of the shifting ranges thereof.

In the continuously variable shifting running in which the shifting mechanism 10 is switched to the continuously variable shifting state, the automatic shift control is executed within the total speed ratio γT in which the shifting mechanism 10 can be shifted in each of the shifting ranges thereof, and which is obtained by continuously variable shift width i.e. spread of the power distributing mechanism 16, and each of the gear positions of the automatic shifting portion 20 to be automatically controlled corresponding to each of the shifting ranges within the changeable shifting positions. This "M" position corresponds to a shift position for selecting a manually shifting running mode (manual mode) i.e. a control style in which the shifting mechanism 10 is subjected to the manual shifting control.

Figure 7:
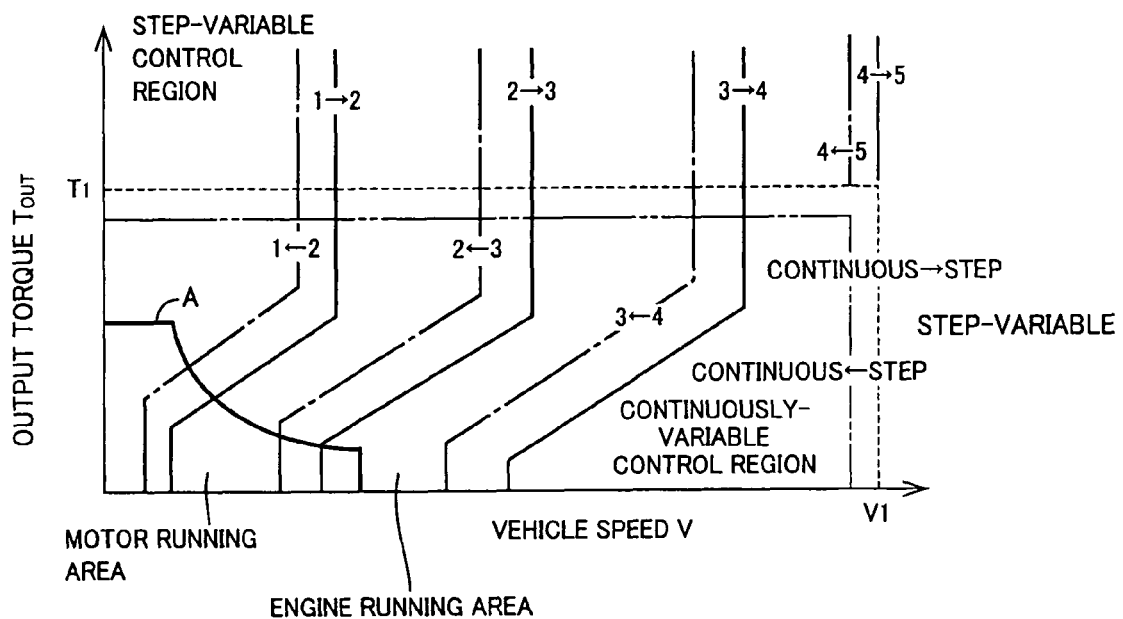
FIG. 7 is a view representing one example of a preliminarily stored shifting diagram, plotted on a two-dimensional coordinate in terms of parameters including a vehicle speed and output torque based on which the operation is executed whether to a shifting is executed in an automatic shifting portion; one example of preliminarily stored shifting diagram based on which a shifting state of the shifting mechanism is switched; and one example of a preliminarily stored drive-force source switching diagram having a boundary line between an engine drive region and a motor drive region based on which an engine drive mode and a motor drive mode is switched.

FIG. 6 is a functional block diagram illustrating an essential part of a control function to be performed with the electronic control device 40. In FIG. 6, step-variable shifting control means 54 functions as shifting control means for the shifting the shifting the automatic shifting portion 20. For instance, the step-variable shifting control means 54 discriminates whether to execute the shifting in the automatic shifting portion 20 on the basis of a vehicle condition represented by the vehicle speed V and the demanded output torque $T_{OUT}$ for the automatic shifting portion 20 by referring to the relationships (including the shifting diagram and the shifting map), preliminarily stored in memory means 56, which are plotted in solid lines and single dot lines as shown in FIG. 7. That is, the step-variable shifting control means 54 discriminates a shifting position to be shifted in the automatic shifting portion 20, thereby causing the automatic shifting portion 20 to execute the shifting so as to obtain the discriminated shifting position. When this takes place, the step-variable shifting control means 54 outputs a command (shifting output command) to the hydraulic control circuit 42 for engaging and/or disengaging the hydraulic-type frictionally coupling devices, excepting the switching clutch C0 and the switching brake B0, so as to achieve a desired shifting position in accordance with, for instance, the engagement operation table shown in FIG. 2.

Hybrid control means 52 renders the engine 8 operative in an operating region at high efficiency under the infinitely variable shifting state of the shifting mechanism 10, i.e., the differential state of the differential portion 11. At the same time, the hybrid control means 52 causes the engine 8 and the second electric motor M2 to deliver drive forces at varying distributing rates while causing the first electric motor M1 to generate electric power at a varying rate for a reactive force to be generated at an optimum value, thereby controlling the speed ratio γ0 of the differential portion 11 placed in the electrically controlled continuously variable transmission.

For instance, during the running of the vehicle at a current vehicle speed, the hybrid control means 52 calculates a target (demanded) output of the vehicle by referring to the displacement value Acc of the accelerator pedal and the vehicle speed V that collectively represents the output demanded value intended by the driver. Then, the hybrid control means 52 calculates a demanded total target output based on the target output and a charging request value of the vehicle. In order to obtain the total target output, the hybrid control means 52 calculates a target engine output with taking account of the transmitting a loss, loads on auxiliary units and assisting torque of the second electric motor M2, etc. Then, the hybrid control means 52 controls the engine 8 so as to provide the engine rotation speed NE and engine torque TE such that the target engine output is obtained, while controlling the first electric motor M1 to generate electric power at a proper power rate.

The hybrid control means 52 executes a hybrid control with taking account of the gear position of the automatic shifting portion 20 so as to obtain power performance and improved fuel consumption. During such a hybrid control, the differential portion 11 is rendered operative to function as the electrically controlled continuously variable transmission for the purpose of matching the engine rotation speed NE, determined for the engine 8 to operate at a high efficiency, to the rotation speed of the power transmitting member 18 determined based on the vehicle speed V and the selected gear position of the automatic shifting portion 20.

To this end, the hybrid control means 52 preliminarily stores therein an optimum fuel economy curve (including a fuel economy map and relevant relationshipships) of the engine 8 preliminarily determined on an experimental basis such that, during the running of the vehicle under the continuously variable shifting state, the vehicle has drivability and fuel economy performance in compatibility on a two-dimensional coordinate with parameters including, for instance, the engine rotation speed NE and output torque (engine torque) TE of the engine 8. In order to cause the engine 8 to operate on such an optimum fuel economy curve, a target value on the total speed ratio γT of the shifting mechanism 10 is determined so as to obtain engine torque TE and the engine rotation speed NE for the demanded engine output to be generated so as to satisfy, for instance, the target output (total target output and demanded drive force). To achieve such a target value, the hybrid control means 52 controls the speed ratio γ0 of the differential portion 11, while controlling the total speed ratio γT within a variable shifting range at a value, for instance, ranging from 13 to 0.5.

During such hybrid control, the hybrid control means 52 allows electric energy, generated by the first electric motor M1, to be supplied to a battery 60 and the second electric motor M2 through an inverter 58. This allows a major part of the drive force, delivered from the engine 8, to be mechanically transmitted to the power transmitting member 18 and the rest of the drive force of the engine 8 is delivered to the first electric motor M1 to be consumed thereby for conversion to electric power. The resulting electric energy is supplied through the inverter 58 to the second electric motor M2, which in turn is driven to provide a drive force for delivery to the power transmitting member 18. Equipments, involved in the operation of generating electric energy and the operation causing the second electric motor M2 to consume electric energy, establish an electric path in which the part of the drive force, delivered from the engine 8, is converted to electric energy which in turn is converted into mechanical energy.

The hybrid control means 52 functionally includes engine output control means for executing an output control of the engine 8 so as to provide the demanded engine output. The engine output control means allows the throttle actuator 97 to perform a throttle control so as to controllably open or close the electronic throttle valve 96. In addition, the engine output control means outputs commands to the engine output control device 43 so as to cause the fuel injection device 98 to control the fuel injection quantity and fuel injection timing for performing a fuel injection control while permitting the ignition device 99, such as an igniter or the like, to control an ignition timing for an ignition timing control. These commands are output in a single mode or a combined mode. For instance, the hybrid control means 52 drives the throttle actuator 97 in response to the acceleration opening signal Acc by fundamentally referring to the preliminarily stored relationship, not shown, so as to execute the throttle control such that the greater the accelerator opening Acc, the greater will be the throttle valve opening $\theta_{TH}$.

A solid line A, shown in FIG. 7, represents a boundary line between an engine drive region and a motor drive region for the engine 8 and an electric motor, i.e., for instance, the second electric motor M2 to be selectively switched as a drive force source for the vehicle to perform a startup/running (hereinafter referred to as "running"). In other words, the boundary line is used for switching a so-called engine drive mode, in which the engine 8 is caused to act as a running drive force source for starting up/running (hereinafter referred to as "running") the vehicle, and a so-called motor drive mode in which the second electric motor M2 is caused to act as a drive force source for running the vehicle.

The preliminarily stored relationship, having the boundary line (in the solid line A) shown in FIG. 7 for the engine drive region and the motor drive region to be switched, represents one example of a drive-force source switching diagram (drive force source map), formed on a two-dimensional coordinate, which includes parameters such as the vehicle speed V and output torque $T_{OUT}$ representing a drive force correlation value. Memory means 56 preliminarily stores such a drive-force source switching diagram together with the shifting diagram (shifting map) designated by, for instance, the solid line and the single dot line in FIG. 7.

The hybrid control means 52 determines which of the motor drive region and the engine drive region is to be selected based on the vehicle condition, represented by the vehicle speed V and demanded torque output $T_{OUT}$ by referring to, for instance, the drive-force source switching diagram shown in FIG. 7, thereby executing the motor drive mode or the engine drive mode. Thus, the hybrid control means 52 executes the motor drive mode at relatively low output torque $T_{OUT}$, i.e., low engine torque TE, at which an engine efficiency is generally regarded to be lower than that involved in a high torque region, or a relatively low vehicle speed range of the vehicle speed V, i.e., under a low load region as will be apparent from FIG. 7.

During such a motor drive mode, the hybrid control means 52 renders the differential portion 11 operative to perform an electrical CVT function (differential function) for controlling the first-motor rotation speed NM1 at a negative rotation speed, i.e., at an idling speed to maintain the engine rotation speed NE at a zeroed or nearly zeroed level, thereby minimizing a drag of the engine 8, remained under a halted state, for providing improved fuel economy.

Further, even under the engine drive region, the hybrid control means 52 may execute the operation to allow the second electric motor M2 to be supplied with electric energy, generated by the first electric motor M1, and/or electric energy delivered from the battery 60 via the electric path mentioned above. This causes the second electric motor M2 to be driven for performing a torque assisting operation to assist the drive force of the engine 8. Thus, for the illustrated embodiment, the term "engine drive mode" may refer to an operation covering the engine drive mode and the motor drive mode in combination.

Further, the hybrid control means 52 can cause the differential portion 11 to perform the electrical CVT function through which the engine 8 can be maintained under the operating state regardless of the vehicle left in a halted condition or a low speed condition. For instance, if a drop occurs in a state of charge SOC of the battery 60 during the halt of the vehicle with a need occurring on the first electric motor M1 to generate electric power, the drive force of the engine 8 drives the first electric motor M1 to generate electric power with an increase in the rotation speed of the first electric motor M1. Thus, even if the second-motor rotation speed $N_{M2}$, uniquely determined with the vehicle speed V, is zeroed (nearly zeroed) due to the halted condition of the vehicle, the power distributing mechanism 16 performs the differential action, causing the engine rotation speed NE to be maintained at a level beyond an autonomous rotation speed.

The hybrid control means 52 executes the operation to cause the differential portion 11 to perform the electrical CVT function for controlling the first-motor M1 rotation speed $N_{M1}$ and the second-motor M2 rotation speed $N_{M2}$ to maintain the engine rotation speed NE at an arbitrary level regardless of the vehicle remaining under the halted or running state. As will be understood from the collinear chart shown in FIG. 3, for instance, when raising the engine rotation speed NE, the hybrid control means 52 executes the operation to maintain the second-motor M2 rotation speed $N_{M2}$, bound with the vehicle speed V, at a nearly fixed level while raising the first-motor M1 rotation speed $N_{M1}$.

In placing the shifting mechanism 10 in the step-variable shifting state, increasing-speed gear-position determining means 62 determines which of the switching clutch C0 and the switching brake B0 is to be engaged. To this end, the increasing-speed gear-position determining means 62 executes the operation based on, for instance, the vehicle condition according to the shifting diagram, shown in FIG. 7, which is preliminarily stored in the memory means 56, to determine whether or not a gear position to be shifted in the shifting mechanism 10 is an increasing-speed gear position, i.e., for instance, a 5th-speed gear position.

The switching control means 50 switches the engaging and disengaging states of the differential state switching device (switching clutch C0 and switching brake B0) based on the vehicle condition, thereby selectively executing a switchover between the continuously variable shifting state and the step-variable shifting state, i.e., between the differential state and the locked state. For instance, the switching control means 50 executes the operation based on the vehicle condition, represented with the vehicle speed V and demanded output torque $T_{OUT}$, by referring to the relationships (shifting diagram and shifting map), preliminarily stored in the memory means 56, which are shown in the broken line and the double dot line in FIG. 7, thereby determining whether to switch the shifting state of the shifting mechanism 10 (differential portion 11). That is, the operation is executed to determine whether there exist a continuously variable shifting control region for the shifting mechanism 10 to be placed in the continuously variable shifting state or a step-variable shifting control region for the shifting mechanism 10 to be placed in the step-variable shifting state. This allows the operation to be executed for determining the shifting state to be switched in the shifting mechanism 10, thereby executing the operation to selectively switch the shifting state to one of the continuously variable shifting state and the step-variable shifting state.

More particularly, if the determination is made that the shifting mechanism 10 lies in the step-variable shifting control region, then, the switching control means 50 outputs a signal to the hybrid control means 52 for disenabling or interrupting the hybrid control or the continuously variable shifting control, while permitting the step-variable shifting control means 54 to perform the shifting for the step-variable shifting operation that has been preliminarily determined. When this takes place, the step-variable shifting control means 54 allows the automatic shifting portion 20 to perform the automatic shifting in accordance with, for instance, the shifting diagram shown in FIG. 7 and preliminarily stored in the memory means 56.

For instance, the engagement operation table, shown in FIG. 2 and preliminarily stored in the memory means 56, represents the operations in combination of the hydraulically operated frictional engaging devices, that is, the clutches C0, C1 and C2 and the brakes B0, B1, B2 and B3 to be selected in such a shifting operation. That is, a whole of the shifting mechanism 10, i.e., the differential portion 11 and the automatic shifting portion 20, functions as a so-called step-variable automatic transmission, thereby establishing the gear positions according to the engagement operation table shown in FIG. 2.

For instance, if the increasing-speed gear-position determining means 62 determines that the 5th-gear position is to be selected, the shifting mechanism 10 as a whole can obtain a so-called overdrive-gear position on an increasing-speed gear position with a speed ratio less than "1.0" as a whole. To this end, the switching control means 50 outputs a command to the hydraulic control circuit 42 for disengaging the switching clutch C0 and engaging the switching brake B0 to allow the differential portion 11 to function as an auxiliary power transmission with a fixed speed ratio γ0, i.e., for instance, the speed ratio γ0 equal to "0.7".

If the increasing-speed gear-position determining means 62 determines that no 5th-gear position is to be selected, the shifting mechanism 10 as a whole can obtain a decreasing-speed gear position with a speed ratio of "1.0" or more. To this end, the switching control means 50 outputs another command to the hydraulic control circuit 42 for engaging the switching clutch C0 and disengaging the switching brake B0 to allow the differential portion 11 to function as the auxiliary power transmission with the fixed speed ratio γ0, i.e., for instance, the speed ratio γ0 equal to "1".

Thus, the switching control means 50 causes the shifting mechanism 10 to be switched in the step-variable shifting state under which the operation is executed to selectively switch the gear positions of two kinds to either one gear position. With the differential portion 11 rendered operative to function as the auxiliary power transmission while the automatic shifting portion 20, connected to the differential portion 11 in series, is rendered operative to function as the step-variable transmission, the shifting mechanism 10 as a whole is rendered operative to function as the so-called step-variable automatic transmission.

On the contrary, if the switching control means 50 determines that the shifting mechanism 10 remains in the continuously variable shifting control region to be switched in the continuously variable shifting state, the shifting mechanism 10 as a whole can obtain the continuously variable shifting state. To this end, the switching control means 50 outputs a command to the hydraulic control circuit 42 for disengaging both the switching clutch C0 and the switching brake B0 so as to place the differential portion 11 in the continuously variable shifting state to enable an infinitely variable shifting operation to be executed. Simultaneously, the switching control means 50 outputs a signal to the hybrid control means 52 for permitting the hybrid control to be executed, while outputting a given signal to the step-variable shifting control means 54. As used herein, the term "given signal" refers to a signal, by which the shifting mechanism 10 is fixed to a gear position for a predetermined continuously variable shifting state, or a signal for permitting the automatic shifting portion 20 to perform the automatic shifting according to, for instance, the shifting diagram, shown in FIG. 7, which is preliminarily stored in the memory means 56.

In this case, the step-variable shifting control means 54 performs the automatic shifting upon executing the operation excepting the operations to engage the switching clutch C0 and the switching brake B0 in the engagement operation table shown in FIG. 2. This causes the switching control means 50 to switch the differential portion 11 to the continuously variable shifting state to function as the continuously variable transmission, while rendering the automatic shifting portion 20, connected to the differential portion 11 in series, operative to function as the step-variable transmission. This allows a drive force to be obtained with an appropriate magnitude. Simultaneously, the rotation speed input to the automatic shifting portion 20, i.e., the rotation speed of the power transmitting member 18 is continuously varied for each gear position of the 1st-speed, 2nd-speed, 3rd-speed and 4th-speed positions of the automatic shifting portion 20, enabling the respective gear positions to be obtained in infinitely variable speed ratio ranges. Accordingly, since the speed ratio is continuously variable across the adjacent gear positions, the shifting mechanism 10 as a whole can obtain the overall speed ratio γT in an infinitely variable mode.

Now, FIG. 7 will be described more in detail. FIG. 7 is a view showing the relationships (shifting diagram and shifting map), preliminarily stored in the memory means 56, based on which the shifting of the automatic shifting portion 20 is determined, and representing one example of the shifting diagram plotted on a two-dimensional coordinate with parameters including the vehicle speed V and demanded output torque $T_{OUT}$ indicative of the drive force correlation value. In FIG. 7, the solid lines represent upshift lines and single dot lines represent downshift lines.

In FIG. 7, the broken lines represent a determining vehicle speed V1 and a determining output torque T1 for the switching control means 50 to determine the step-variable control region and the continuously variable control region. That is, the broken lines in FIG. 7 represent a high vehicle-speed determining line, forming a series of a determining vehicle speed V1 representing a predetermined high-speed drive determining line for determining a high speed running state of a hybrid vehicle, and a high-output drive determining line, forming a series of determining output torque T1 representing a predetermined high-output drive determining line for determining the drive force correlation value related to the drive force of the hybrid vehicle. As used herein, the term "drive force correlation value" refers to determining output torque T1 that is preset for determining a high output drive for the automatic shifting portion 20 to provide output torque $T_{OUT}$ at a high output.

A hysteresis is provided for determining the step-variable control region and the continuously variable control region as indicated by a double dot line in FIG. 7 in contrast to the broken line. That is, FIG. 7 represents a shifting diagram (switching map and relationship), preliminarily stored in terms of the parameters including the vehicle speed V, including the determining vehicle speed V1 and determining output torque T1, and output torque $T_{OUT}$, based on which the switching control means 50 executes the determination on a region as to which of the step-variable control region and the continuously variable control region belongs to the shifting mechanism 10.

The memory means 56 may preliminarily store the shifting map, inclusive of such a shifting diagram. Moreover, the shifting diagram may be of the type that includes at least one of the determining vehicle speed V1 and determining output torque T1 and may include a preliminarily stored shifting diagram with a parameter taking any of the vehicle speed V and output torque $T_{OUT}$.

The shifting diagram, the switching diagram or the drive-force source switching diagram or the like may be stored not in the map but in a determining formula for making comparison between a current vehicle speed V and a determining vehicle speed V1, and another determining formula or the like for making comparison between output torque $T_{OUT}$ and determining output torque T1. In this casing, the switching control means 50 places the shifting mechanism 10 in the step-variable shifting state when the vehicle condition such as, for instance, an actual vehicle speed exceeds the determining vehicle speed V1. In addition, the switching control means 50 places the shifting mechanism 10 in the step-variable shifting state when the vehicle condition such as, for instance, output torque $T_{OUT}$ of the automatic shifting portion 20 exceeds determining output torque T1.

When a malfunction or functional deterioration occurs in electric control equipment such as an electric motor or the like used for rendering the differential portion 11 operative as the electrically controlled continuously variable transmission, the switching control means 50 may be configured to place the shifting mechanism 10 in the step-variable shifting state on a priority basis for the purpose of ensuring the running of the vehicle to even if the shifting mechanism 10 remains in the continuously variable control region. As used herein, the term "malfunction or functional deterioration in electrical control equipment" refers to a vehicle condition in which: functional degradation occurs in equipment related to the electrical path involved in the operation of the first electric motor M1 to generate electric energy and the operation executed in converting such electric energy to mechanical energy; that is, failures or functional deteriorations, caused by a breakdown or low temperature, occur in the first electric motor M1, the second electric motor M2, the inverter 58, the battery 60 and transmission paths interconnecting these component parts.

As used herein, the term "drive force correlation value" described above refers to a parameter corresponding to the drive force of the vehicle in one-to-one relation. Such a parameter may include not only drive torque or drive force delivered to the drive wheels 38 but also: output torque $T_{OUT}$ of the automatic shifting portion 20; engine output torque TE; an acceleration value of the vehicle; an actual value such as engine output torque TE calculated based on, for instance, the accelerator operating or the throttle valve opening $\theta_{TH}$ (or an intake air quantity, an air/fuel ratio or a fuel injection amount) and the engine rotation speed NE; or an estimated value such as engine output torque TE or the demanded output torque $T_{OUT}$ for the automatic shifting portion 20 or demanded vehicle drive force calculated based on a displacement value of the accelerator pedal actuated by the driver or the throttle valve operating or the like. In addition, the drive torque may be calculated upon taking a differential ratio and a radius of each drive wheel 38 into consideration by referring to output torque $T_{OUT}$ or the like or may be directly detected using a torque sensor or the like. This is true for each of other torques mentioned above.

For instance, the operation of the shifting mechanism 10 under the continuously variable shifting state during the running of the vehicle at the high speed turns out a consequence of deterioration in fuel economy. The determining vehicle speed V1 is determined to a value that can render the shifting mechanism 10 operative in the step-variable shifting state during the running of the vehicle at the high speed so as to address such an issue. Further, determining torque T1 is determined to a value that prevents reactive torque of the first electric motor M1 from covering a high output region of the engine during the running of the vehicle at a high output. That is, determining torque T1 is determined to such a value depending on, for instance, a characteristic of the first electric motor M1 that is possibly mounted with a decreased maximum output in electric energy for miniaturizing the first electric motor M1.

Figure 8:
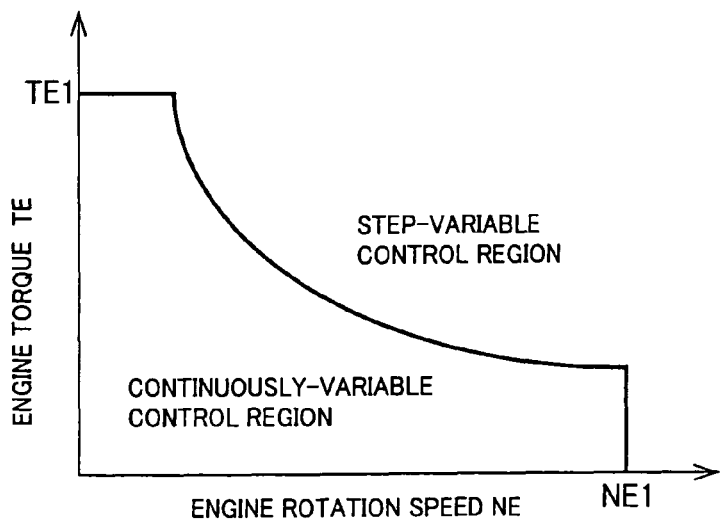
FIG. 8 is a conceptual view, showing the preliminarily stored relationship, involving a boundary line, between a continuously variable control region and a step-variable control region, which is suitable for mapping a boundary between the continuously variable control region and the step-variable control region shown in broken lines in FIG. 7.

FIG. 8 represents a switching diagram (switching map and relationship), preliminarily stored in the memory means 56, which has an engine output line in the form of a boundary line to allow the switching control means 50 to determine a region based on the step-variable control region and the continuously variable control region using parameters including the engine rotation speed NE and engine torque TE. The switching control means 50 may execute the operation based on the engine rotation speed NE and engine torque TE by referring to the switching diagram shown in FIG. 8 in place of the switching diagram shown in FIG. 7. That is, the switching control means 50 may determine whether the vehicle condition, represented with the engine rotation speed NE and engine torque TE, lies in the step-variable control region or the continuously variable control region.

Further, FIG. 8 is also a conceptual view based on which the broken line in FIG. 7 is to be created. In other words, the broken line in FIG. 7 is also a switching line rewritten on a two-dimensional coordinate in terms of the parameters including the vehicle speed V and output torque $T_{OUT}$ based on the relational diagram (map) shown in FIG. 8.

As indicated on the relationships shown in FIG. 7, the step-variable control region is set to lie in a high torque region, where output torque $T_{OUT}$ is greater than the predetermined determining output torque T1, or a high vehicle speed region where the vehicle speed V is greater than the predetermined determining vehicle speed V1. Therefore, a step-variable shift drive mode is effectuated in a high drive torque region, where the engine 8 operates at relatively high torque, or the vehicle speed remaining in a relatively high speed region. Further, a continuously variable shift drive mode is effectuated in a low drive torque region, where the engine 8 operates at relatively low torque, or the vehicle speed remaining in a relatively low speed region, i.e., during a phase of the engine 8 operating in a commonly used output region.

As indicated by the relationship shown in FIG. 8, similarly, the step-variable control region is set to lie in a high-torque region with engine torque TE exceeding a predetermined given value TE1, a high-speed rotating region with the engine rotation speed NE exceeding a predetermined given value NE1, or a high output region where the engine output calculated, based on engine torque TE and the engine rotation speed NE, is greater than a given value. Therefore, the step-variable shift drive mode is effectuated at relatively high torque, relatively high rotation speed or relatively high output of the engine 8. The continuously variable shift drive mode is effectuated at relatively low torque, relatively low rotation speed or relatively low output of the engine 8, i.e., in the commonly used output region of the engine 8. The boundary line, shown in FIG. 8, between the step-variable control region and the continuously variable control region corresponds to a high vehicle-speed determining line which is a series of a high vehicle-speed determining line and a high-output drive determining value which is a series of a high-output drive determining value.

With such a boundary line, for instance, during the running of the vehicle at a low/medium speed and low/medium output, the shifting mechanism 10 is placed in the continuously variable shifting state to ensure the vehicle to have improved fuel economy performance. During the running of the vehicle at a high speed with an actual vehicle speed V exceeding the determining vehicle speed V1, the shifting mechanism 10 is placed in the step-variable shifting state to act as the step-variable transmission. In this moment, the output of the engine 8 is transferred to the drive wheels 38 mainly through a mechanical power transmitting path. This suppresses a loss in conversion between the drive force and electric energy, generated when the shifting mechanism 10 is caused to act as the electrically controlled continuously variable transmission, providing improved fuel consumption.

During the running of the vehicle on the high output drive mode with the drive force correlation value, such as output torque $T_{OUT}$ or the like, which exceeds determining torque T1, the shifting mechanism 10 is placed in the step-variable shifting state to act as the step-variable transmission. In this moment, the output of the engine 8 is transferred to the drive wheels 38 mainly through the mechanical power transmitting path. In this case, the electrically controlled continuously variable transmission is caused to operate in the low/medium speed running region and the low/medium output running region of the vehicle. This enables a decrease in the maximum value of electric energy to be generated by the first electric motor M1, i.e., electric energy to be transmitted by the first electric motor M1, thereby causing the first electric motor M1 per se or a vehicle drive apparatus including such a component part to be further miniaturized in structure.

According to another viewpoint, further, during the running of the vehicle on such a high output drive mode, the driver places more emphasis on a requirement for the drive force and less emphasis on a requirement for a mileage and, thus, the shifting mechanism 10 is switched to the step-variable shifting state (fixed shifting state) rather than to the continuously variable shifting state. With such a switching operation, the driver can enjoy a fluctuation in the engine rotation speed NE, i.e., a rhythmical variation in the engine rotation speed NE caused by the upshifting in the step-variable automatic shift running mode.

Referring back to FIG. 6, an engine-stop condition establishment determining means 110 determines whether condition for stopping a fuel supply to the engine 8 to thereby stop the operation thereof is established. For example, the engine-stop condition establishment determining means 110 determines establishment of the operation stopping condition of the engine 8, when for example operation of the engine 8 is stopped after the vehicle is stopped, or a warming-up operation by the engine 8 is completed.

When the engine-stop condition establishment determining means 110 determines establishment of the operation stopping condition of the engine 8, an engine stop controlling means 112 outputs a command to stop the fuel supply to the engine 8 by the fuel injection device 98 i.e. a command to execute a fuel cut to the engine output control device 43. When the engine 8 is brought into a stopped state due to absence of the fuel supply, no engine torque TE is output. The first electric motor M1 is brought into an idle state not to generate a reaction force. Thus, the engine rotation speed NE decreases toward zero (0), reaching a stopped state Various vibrations occur in a vehicle. From a viewpoint of comfort to the vehicle occupants, or in consideration of influence of a vehicle exterior noise to an environment, the vibrations or the noise caused by the vibration is preferably decrease to level as small as possible. For example, torsional vibration in the power transmitting system is generated by variations in engine torque TE resulting from the rotary motion of the engine 8 which is a vibration source. The power transmitting system i.e. the shifting mechanism 10 includes rotary shafts of the first and second electric motors M1 and M2 including an engine crank shaft. This vibration is increased or amplified by a resonance phenomena of the power transmitting system, There is a fear that vibrations transmitted to a vehicle body via, for example, an engine mount, or a noise caused by these vibrations may give discomfort to a vehicle occupant depending on its level.

For example, the resonance phenomena may occur, when the engine rotation speed NE falls into a specific engine rotation speed area (resonance point) less than the idle rotation speed in a changing process upon operation stopping condition of the engine 8, the engine rotation speed NE decreases to reach a rotation-stopped state.

Therefore, to prevent the occurrence of the resonance in the power transmitting system which causes level of the vibrations to exceed a predetermined value in this embodiment, the engine rotation speed NE is controlled to rapidly pass through an area where resonance is liable to occur. For example, the engine rotation speed NE is controlled by the first electric motor M1 so as to rapidly pass through the rotation speed area (resonance point) of the engine 8, of about 400 rpm, where the vehicle vibrations increases to the level greater than a predetermined value by the resonance of the power transmitting system.

The term "resonance point" denotes an engine rotation speed area which is calculated and stored in advance through experiments or the like, and in which there occurs the resonance in the power transmitting system, allowing the level of vehicle vibrations to exceed a predetermined value. The predetermined value is selected in consideration of, for example, the viewpoint of comfort to vehicle occupants.

For example, the resonance point is determined based on, in addition to the engine rotation speed NE, a vehicle state such as the vehicle speed V, the state of variable cylinders of the engine 8, i.e., the number of operating cylinders of the engine 8, or the number of cycles of a variable-cycle engine typified by an electromagnetically-driven valve. This is because the resonance of the shifting mechanism 10 occurs depending on a difference in the vehicle state, for the same engine rotation speed NE or the vehicle speed V. Therefore, the resonance point is selected in consideration of various vehicle states influencing on the occurrence of the resonance of the shifting mechanism 10. Hereinafter, a description will be given for a control operation which controls the resonance occurring in the power transmitting system, when the engine operation is in the stopped state.

When the engine-stop condition establishment determining means 110 determines that operation stopping conditions of the engine 8 is established, the engine stop controlling means 112 controls, in addition to the above-mentioned function, the decreasing speed of the engine rotation speed NE by the first electric motor M1 so as to rapidly become lower than a resonance point. In the resonance point, the resonance in the power transmitting system where vehicle vibrations exceeds a predetermined value may occur. In other words, a command to forcibly decrease the engine rotation speed NE by the first electric motor M1 is output to the hybrid control means 52. According to this command, the hybrid control means 52 brings the first electric motor M1 from an idle state into a drive state, to lower the rotation speed $N_{M1}$ of the first electric motor M1 thereby decreasing the engine rotation speed NE. The first electric motor M1 of this embodiment corresponds to the electric motor of the present invention.

Figure 9:
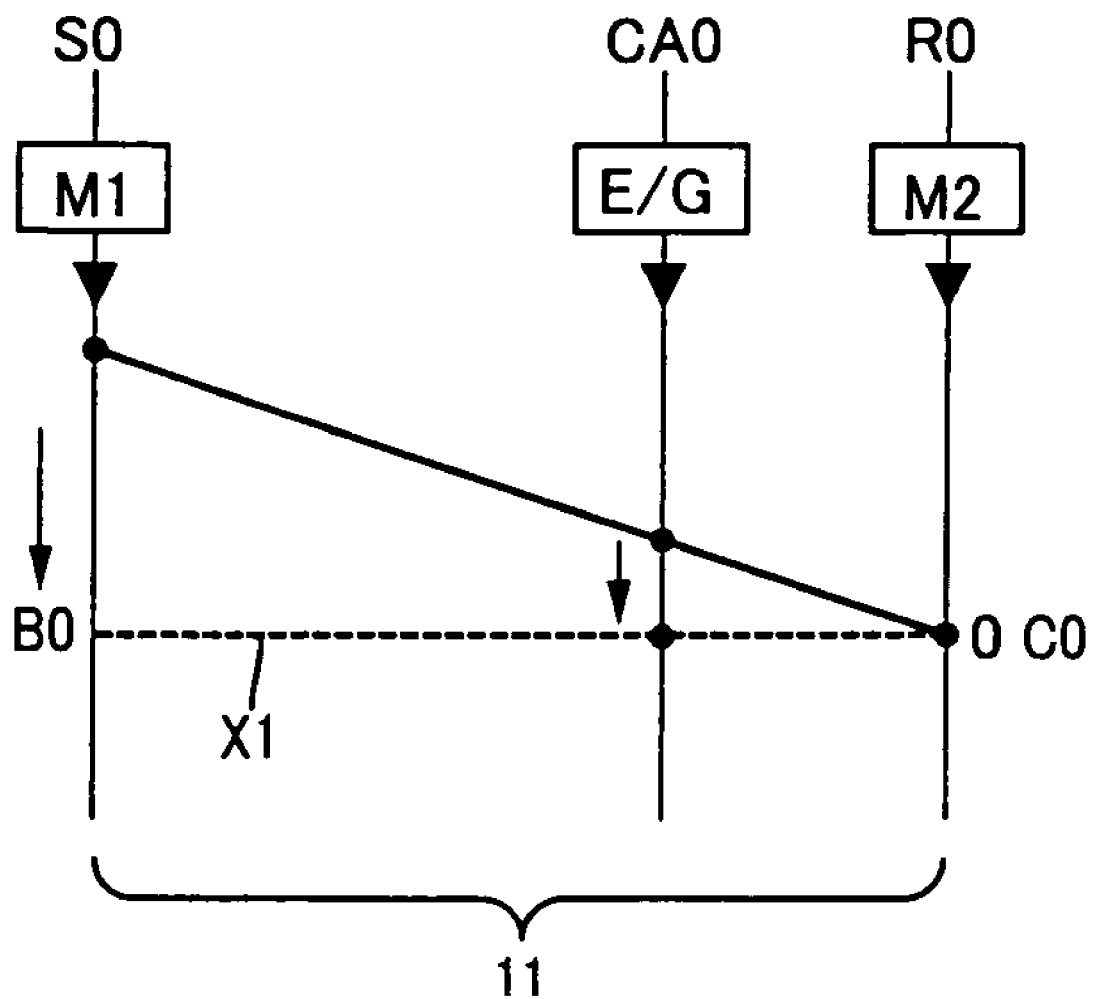
FIG. 9 is a collinear chart illustrating the relative rotation speed of each rotary element of the differential portion, explaining control under which the engine rotation speed is decreased by the first electric motor.

FIG. 9 is a collinear chart illustrating the relative rotation speed among the rotary elements of the differential portion 11, and explains a decreasing control for the engine rotation speed NE by the first electric motor M1. For example, if the operation of the engine 8 is stopped in a vehicle stopped state, the engine stop controlling means 112 decreases the rotation speed $N_{M1}$ of the first electric motor M1 to zero (0), by allowing the first electric motor M1 to output a negative torque. The rotation speed $N_{M1}$ is decreased as shown from the rotation state shown by the solid line to the state shown by the broken line. Resultantly, the engine rotation speed NE is decreased by the differential operation of the differential portion 11. A decreasing change speed of the engine rotation speed NE by the engine stop controlling means 112 is pre-set through experiments or the like to rapidly decrease for thereby the occurrence of vehicle vibrations having a level exceeding a predetermined value. Apparently, the engine rotation speed NE more quickly decreases than a case in which the engine rotation speed NE naturally decreases in the engine-operation stopped state.

When the engine-stop-condition establishment determining means 110 determines that the operation stopping condition of the engine 8 is established, the engine stop controlling means 112 outputs a command to forcibly decrease the engine rotation speed NE by the first electric motor M1 to the hybrid control means 52. This command is output so as to bring the engine rotation speed NE into a rotation-stopped state. However, there is a fear that so-called "undershooting" may occur depending on the decreasing speed of the engine rotation speed NE by the engine stop controlling means 112 is decreased, or on the naturally decreasing speed of the engine rotation speed NE in the engine-operation stopped state. In the undershooting, the engine rotation speed NE becomes less than zero (0) when the rotation of the engine 8 stops. Occurrence of undershooting generates the vehicle vibration.

In view of this, upon control performance to bring the engine rotation speed NE into a rotation-stopped state, the engine stop controlling means 112 decreases the engine rotation speed NE such that the occurrence of undershooting is suppressed. For example, the decreasing speed of the rotation speed $N_{M1}$ of the first electric motor M1 by the hybrid control means 52 is pre-set through experiments or the like so as to suppress the occurrence of undershooting.

Herein, for example, when the charge capacity SOC of the battery 60 supplying the electric power to the first and second electric motors M1 and M2 falls within an overcharge area or an overdischarge area, the battery 60 may come into a charge/discharge-limited state. In this case, the operational states of the first electric motor M1 and the second electric motor M2 are limited, which limits the output torque thereof. If engine-stop control is performed by the first electric motor M1 in this state, the output torque of the first electric motor M1 and that of the second electric motor M2 are limited (decreased). Thus, there is a fear that the decreasing change speed of the engine rotation speed NE to zero (0) may become slower than that in a normal case, which requires longer time to pass through a resonance point. Consequently, there is a fear that vibrations of the power transmitting system is amplified by the resonance phenomena, which gives discomfort to vehicle occupants. The battery 60 of this embodiment corresponds to the battery of the present invention.

In view of this, when the engine-stop condition establishment determining means 110 determines that the operation stopping condition of the engine 8 is established and that the operational state of the first electric motor M1 is limited, the engine stop controlling means 112 performs the following control. That is, the switching brake B0 limiting the rotation of the differential-portion sun gear S0 and the switching clutch C0 limiting the relative rotations of the differential-portion sun gear S0 and the differential-portion carrier CA0 are simultaneously used to mechanically limit the differential state of the differential portion 11.

The switching brake B0, and the switching clutch C0, of this embodiment, respectively corresponds to the first limiting means and the differential limiting means, and the second limiting means and the differential limiting means, of the present invention. The differential-portion sun gear S0, and the differential-portion sun gear S0 and the differential-portion carrier CA0, of this embodiment, respectively corresponds to the first rotary element and the second rotary element, of the present invention.

Specifically, the engine stop controlling means 112 locks or controls in the locking direction the first electric motor M1 and the differential-portion sun gear S0 connected thereto. More specifically, by the first application of the engagement pressure, the switching brake B0 is brought into an engagement state or a semi-engagement state to limit the differential state of the differential portion 11. As a result, the engagement torque of the switching brake B0 is further added to the limited output torque of the first electric motor M1 to quickly decrease the rotation speed $N_{M1}$ of the first electric motor M1 is to zero (0). Accordingly, the engine rotation speed NE is quickly decreased by the same action as in the collinear chart of FIG. 9.

The engine stop controlling means 112 locks or controls in the locking direction the differential portion 11. More specifically, the first application of the engagement pressure, the switching clutch C0 is brought into an engagement state or a semi-engagement to limit the differential state of the differential portion 11. Accordingly, the rotary elements of the differential portion 11 are simultaneously or substantially simultaneously rotated together. At this time, for example, if the rotation speed of the differential-portion sun gear S0 is decreased to zero (0) by the engagement of the switching brake B0, the engine rotation speed NE quickly decreases to zero (0).

The above-mentioned control is preferably performed in an extremely low vehicle speed area where the vehicle speed V is zero (0) or about zero (0). If the vehicle speed is in a comparatively high speed area, the engine rotation speed NE cannot be sufficiently decreased even if the switching brake B0 is engaged to lock the rotation speed of the differential-portion sun gear S0 in zero (0). If the switching clutch C0 is further engaged in this state, there is a fear that a load imposed both on the switching brake B0 and the switching clutch C0 may increase to lower durability, and to generate shock upon engagement thereof.

In view of the above, the vehicle speed determining means 114 detects the vehicle speed V, and determines whether it is zero (0) or extremely low near zero (0). The vehicle speed V is calculated based on the output-shaft rotation speed $N_{OUT}$ detected by a rotation speed sensor (not shown) disposed on the output shaft 22 of the automatic shifting portion 20, on the transmission gear ratio of the differential gear mechanism 36, on the rotation diameter of the drive wheel 38, and the like. The vehicle speed determining means 114 determines whether the vehicle speed V calculated in this way falls within the extremely low vehicle speed area near zero (0). Determining the vehicle speed V being zero (0) or extremely low near zero (0) advantageously executes operation of the engine stop controlling means 112 to engage the switching brake B0 and the switching clutch C0.

A charge/discharge limitation determining means 116 determines whether the charge or discharge of the battery 60 supplying electric power to the first and second electric motors M1 and M2 is limited, which is caused by the charge capacity SOC of the battery 60 fallen into the overcharge area or the overdischarge area. If the limited charge/discharge of the battery 60 limits the electric power supplied to the first electric motor M1 and to the second electric motor M2, the operational states of the first electric motor M1 and the second electric motor M2 are limited. Specifically, the torque values output from the first electric motor M1 and the second electric motor M2 are limited.

The charge/discharge limitation determining means 116 further determines whether the first electric motor M1 is in a failed state. Specifically, the failed state is detected by, for example, a failed state detecting circuit (not shown) disposed on the first electric motor M1. If the failed state of the first electric motor M1 is determined, the operational state of the first electric motor M1 is limited. Thus, the operational state of the first electric motor M1 is limited according to the charge/discharge limitation of the battery 60 and the failed state of the first electric motor M1.

An engine stop determining means 118 determines whether the operation of the engine 8 is completely stopped by the engine stop controlling means 112. This determination is executed by, for example, whether the engine rotation speed NE detected by an engine rotation speed sensor (not shown) disposed on the engine 8 is zero (0). If the engine completely stopped state is determined, the engine stop controlling means 112 releases the switching brake B0 and the switching clutch C0 both in an engaged state, which enables quick start of the vehicle in the next motor running mode.

Figure 10:
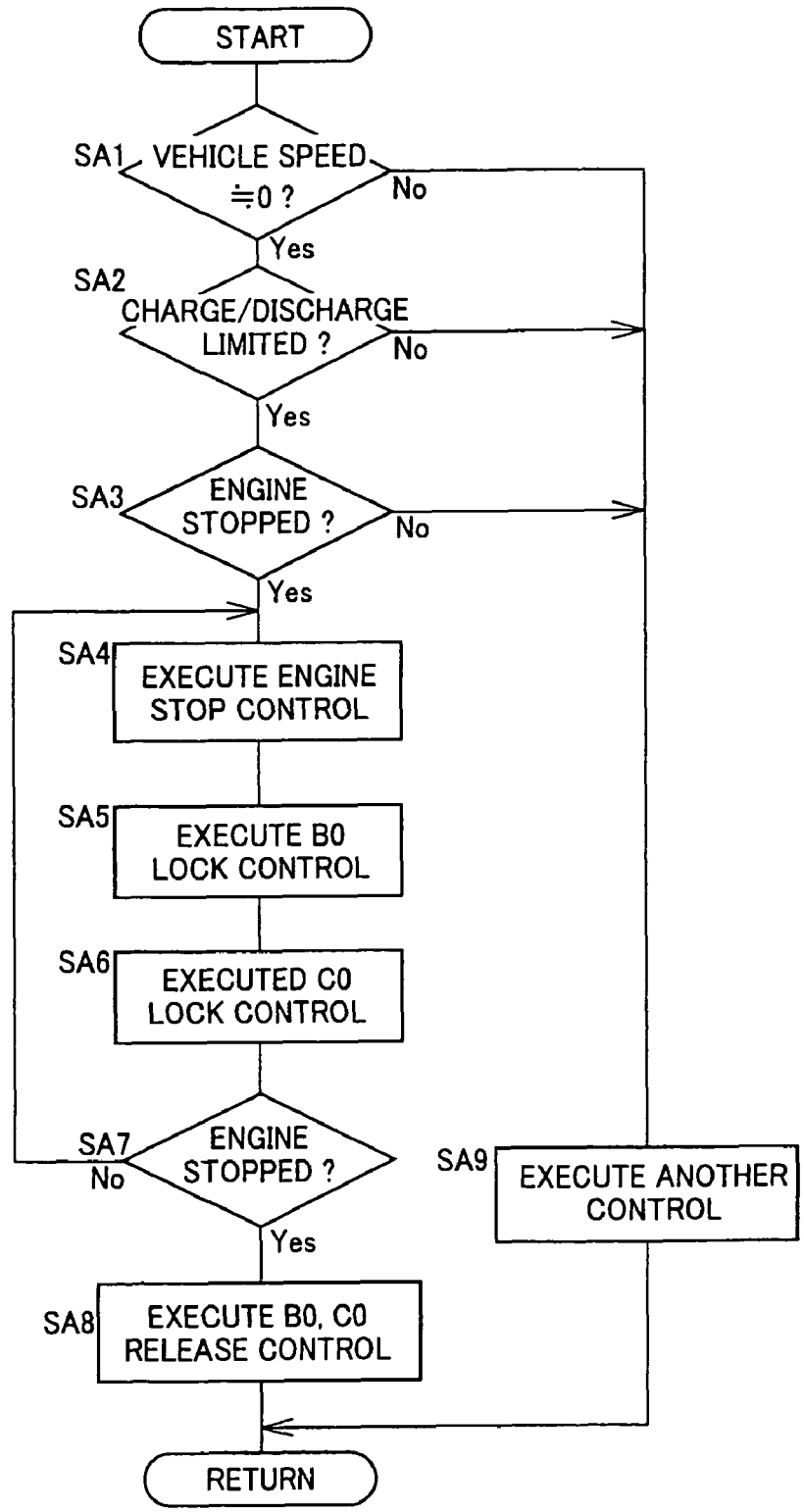
FIG. 10 is a flow chart explaining a main part of a control operation of the electronic control device, i.e., a control operation performed to control the occurrence of vibrations in a vehicle when the engine operation is stopped, especially a control operation performed when the output torque of the first electric motor is limited.
Figure 11:
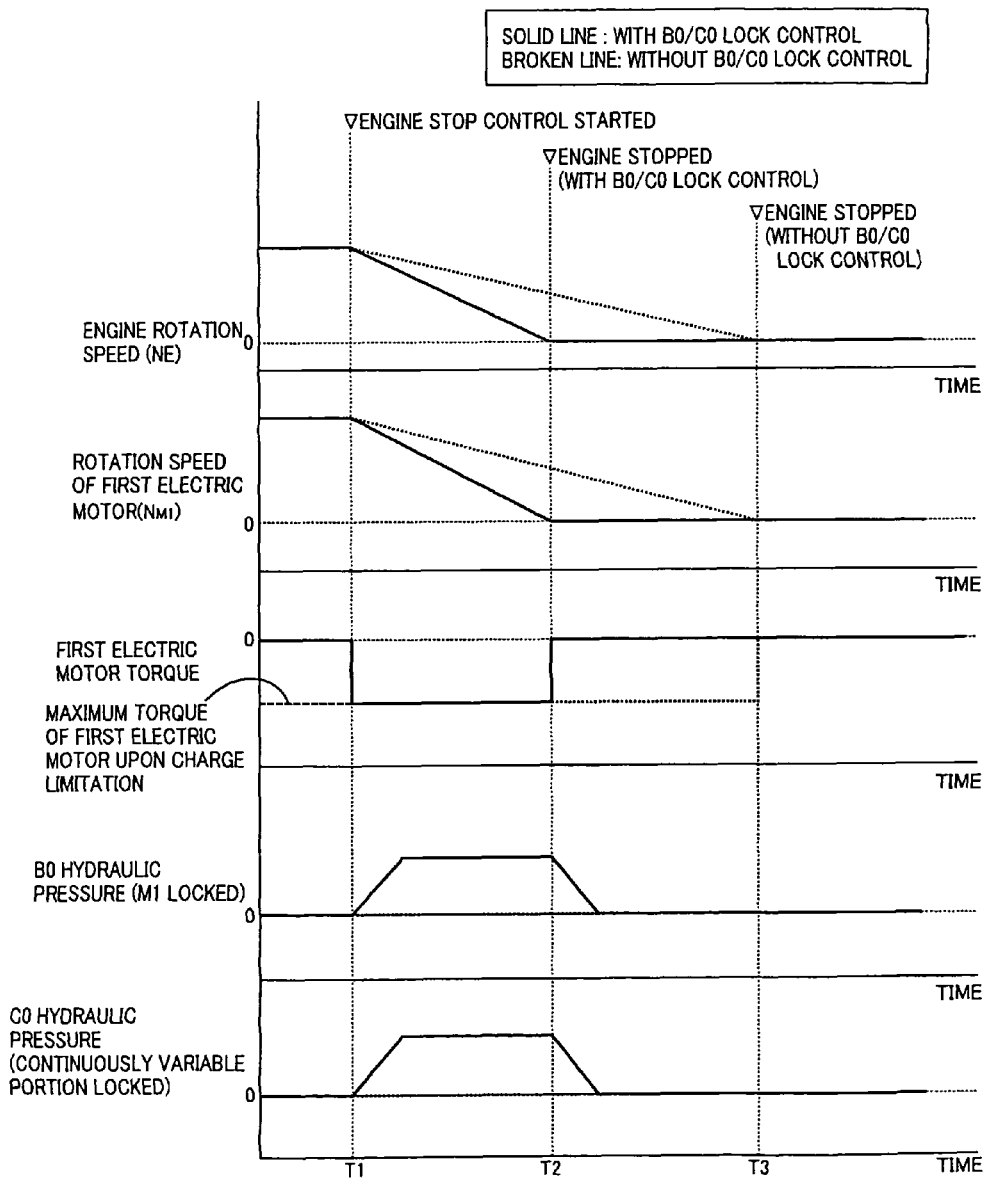
FIG. 11 is a time chart explaining a control operation to stop the operation of the engine while controlling the resonance of a power transmitting system when the output torque of the first electric motor is limited in a vehicle-stopped state, showing one example of the control operation of FIG. 10.

FIG. 10 is a flow chart explaining a main part of a control operation of the electronic control device 40. FIG. 10 explains a control operation for suppressing the of vibrations occurrence in the vehicle upon engine-operation stopped state performed when the output torque of the first electric motor M1 is limited. FIG. 11 shows one example of the control operation of FIG. 10, and it a time chart explaining a control operation to stop the operation of the engine with suppressing the resonance in the power transmitting system, when the output torque of the first electric motor M1 is limited in a vehicle-stopped state.

First, in SA1 corresponding to the vehicle speed determining means 114, it is determined whether the vehicle speed V falls within the zero area or the extremely low vehicle speed area near zero (0). If a negative determination is made in SA1, for example, another engine stop control taking the vehicle speed into consideration is performed in SA9. If an affirmative determination is made in SA1, in SA2 corresponding to the charge/discharge limitation determining means 116, it is determined whether with the limited charge/discharge of the battery 60, the output torque of the first electric motor M1 is limited. Furthermore, whether the first electric motor M1 is in the failed state is determined.

If a negative determination is made in SA2, for example, a usual engine stop control is performed by the first electric motor M1 in SA9. If an affirmative determination is made in SA2, it is determined whether the operation stopping condition of the engine 8 is established in SA3 corresponding to the engine-stop condition establishment determining means 110. If a negative determination is made in SA3, another control is performed in SA9. If an affirmative determination is made in SA3, a command to execute the engine stop control is output in SA4 corresponding to the engine stop controlling means 112, and the engagement of both the switching brake B0 and the switching clutch C0 are started in SA5 and SA6 corresponding to the engine stop controlling means 112.

The operation stopping control of the engine 8 is started at time point T1 of FIG. 11. A negative torque having a direction to decrease the rotation speed $N_{M1}$ of the first electric motor M1 is output from the first electric motor M1 when the battery charge/discharge is limited. This negative torque has a lower value than in a normal case because of the limited output torque of the first electric motor M1. To bring the first electric motor M1 and the differential-portion sun gear S0 connected thereto into the locked state, the engagement oil pressure of the switching brake B0 is increased to start the engagement thereof.

To bring the differential portion 11 into a locked state, the engagement oil pressure of the switching clutch C0 is increased to start the engagement thereof. In this way, the engagement torque of the switching brake B0 acts in a direction to decrease the rotation speed of the first electric motor M1, and the engagement torque of the switching clutch C0 act in a direction to lock the rotary element of the differential portion 11 for thereby decreasing its rotation speed.

As a result, when no control is executed for the switching brake B0 and the switching clutch C0, time period required to decrease the engine rotation speed NE to zero (0) reach a time point T3 as shown by the broken line. On the other hand, when control is executed for the switching brake B0 and the switching clutch C0, time period required to decrease the engine rotation speed NE to zero (0) is shortened to reach a time point T2 as shown by the solid line. Thus, the time period needed for the rotation speed of the engine 8 passing through the resonance point is shortened.

In SA7 corresponding to the engine stop determining means 118, it is determined whether the operation of the engine 8 completely stops. If a negative determination is made in SA7, the process returns to SA4 to repeat the engine stop control until the engine 8 is completely stops. If an affirmative determination is made in SA7 by completely stopping the engine 8, the switching brake B0 and the switching clutch C0 are released to switch the differential portion 11 from the locked state to a non-locked state (a differential state) in SA8 corresponding to the engine stop controlling means 112.

As described above, according to this embodiment, the engine stop controlling means 112 includes the limiting means for limiting the differential state of the differential portion 11 by the switching brake B0 and the switching clutch C0, when the operational state of the first electric motor M1 is limited. Therefore, for example, in the vehicle-stopped state, the torque is given to the engine 8 in the direction decreasing the rotation speed NE thereof by limiting the differential state of the differential portion 11. Accordingly, the rotation speed NE of the engine 8 quickly decreases to pass through the resonance point in the short time period. Hence the occurrence of resonance phenomena can be suppressed.

According to this embodiment, the engine stop controlling means 112 limits the differential state of the differential portion 11 by the combined use i.e. simultaneous use of the differential limitation by both the switching brake B0 and the switching clutch C0. The rotation speed NE of the engine 8 can more quickly decreases by using the switching brake B0 and the switching clutch C0 together, to further shorten the time period required to pass through the resonance point.

According to this embodiment, the operational state limitation of the first electric motor M1 is set according to limitations imposed on the charge/discharge of the battery 60. For this reason, if limitations are imposed on the charge/discharge of the battery 60 during stopped state of the engine control, there is a fear that time period required to decrease the rotation speed NE of the engine 8 to zero (0) will be lengthened, due to the limited output torque of the first electric motor M1. However, limiting the differential state of the differential portion 11 quickly decreases the rotation speed NE of the engine 8 to pass through the resonance point in the shortened time period.

According to this embodiment, the limitation of the operational state of the first electric motor M1 is set according to the failed state thereof. For this reason, if the first electric motor M1 is in the failed state during stopped state of the engine control, due to control inability of the first electric motor M1, there is a fear that time period required to decrease the rotation speed NE of the engine 8 to zero (0) will be lengthened. However, limiting the differential state of the differential portion 11 quickly decreases the rotation speed NE of the engine 8 to pass through the resonance point in the shortened time period.

Next, another embodiment of the present invention will be described. In the following description, the same reference numerals are given to the same elements as in the above-mentioned embodiment, and a description thereof is omitted.

Embodiment 2

Figure 12:
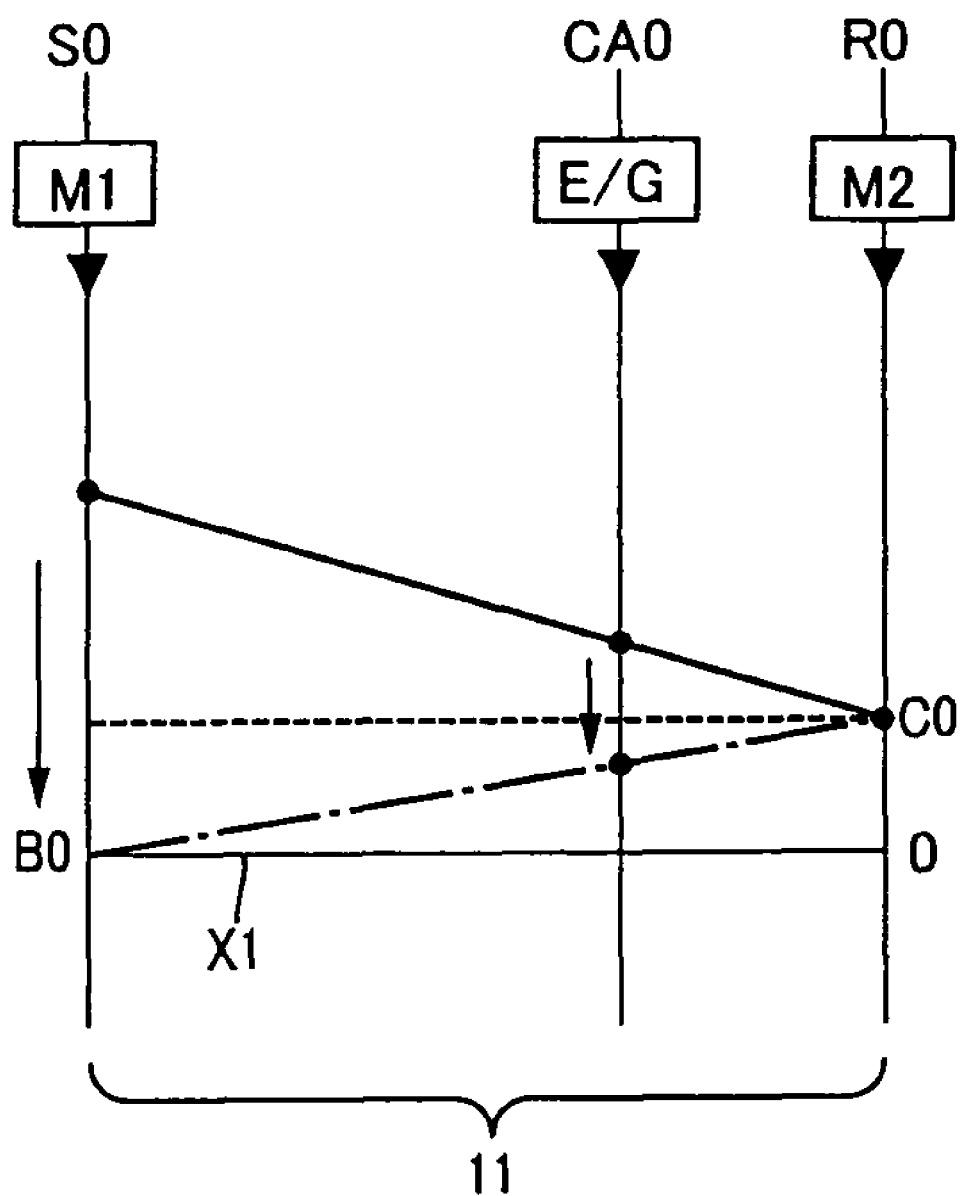
FIG. 12 is a collinear chart illustrating the relative rotation speed of each rotary element of the differential portion, explaining control under which the engine rotation speed is decreased by the first electric motor.

FIG. 12 is another collinear chart illustrating a relative rotation speed of the rotary elements of the differential portion 11, and explaining a control for decreasing the engine rotation speed NE by the first electric motor M1. In this embodiment, a control operation for stopping the engine 8 performed during the vehicle running at a predetermined vehicle speed V will be explained. Specifically, this control is applied to, for example, a case where the vehicle state is switched from an engine running area shown in FIG. 7 to a motor running area, when the vehicle is running in the engine running mode during the decelerating i.e. slowdown vehicle speed.

In this embodiment, the engine stop controlling means 112 allows the switching brake B0 and the switching clutch C0 to be suitably engaged (or semi-engaged) according to a running state, upon control for the engine stopping. Thus, the engine rotation speed NE quickly decreases to pass through the resonance point in the shortened time period. A concrete control operation will be hereinafter described.

In the rotation state shown by the solid line in FIG. 12, the engine-stop-condition establishment determining means 110 determines that conditions for stopping operation of the engine 8 is established, and the charge/discharge limitation determining means 116 determines that the output torque of the first electric motor M1 is limited. Thereby, the switching brake B0 or the switching clutch C0 is engaged.

In detail, for example, when the switching brake B0 is engaged from the state shown by the solid line in FIG. 12, the differential portion 11 is brought into a rotation state shown by the alternate long and short dash line. In other words, the engagement of the switching brake B0 locks the first electric motor M1 (differential-portion sun gear S0), so that the engine rotation speed NE decreases to a rotation speed uniquely determined depending on the rotation speed $N_{M2}$ of the second electric motor M2 (differential-portion ring gear R0) and the gear ratio $\rho0$ of the differential portion 11. When the engine rotation speed NE decreases approximately to this value or level, the engine stop controlling means 112 releases the switching brake B0, and further decrease the engine rotation speed NE to zero (0) by a limited negative output torque of the first electric motor M1.

Herein, it is a premise that upon engagement of the switching brake B0, the uniquely-determined rotation speed mentioned above is lower than the engine rotation speed $NE_{VB}$ corresponding to a resonance point which causes the resonance phenomena. In other words, prior to the engagement of the switching brake B0, the engine stop controlling means 112 calculates an engine rotation speed $NE_{AT}$, which will be indicated after the engagement of the switching brake B0, based on the rotation speed $N_{M2}$ of the second electric motor M2 and the gear ratio $\rho0$. The engine stop controlling means 112 then determines whether its rotation speed $NE_{AT}$ is lower than the engine rotation speed $NE_{VB}$ corresponding to the resonance point. If the engine rotation speed $NE_{AT}$ being lower than the engine rotation speed $NE_{VB}$ corresponding to the resonance point is determined, the engagement of the switching brake B0 is started.

When the switching clutch C0 is engaged from the state of the differential portion 11 shown in the solid line of FIG. 12, the differential portion 11 is brought into a rotation state shown by the broken line. In other words, the engagement of the switching clutch C0 locks the differential portion 11, so that the rotation speeds of the rotary elements decrease to the rotation speed $N_{M2}$ of the second electric motor M2 (differential-portion ring gear R0). When the engine rotation speed NE decreases to the rotation speed same as the rotation speed $N_{M2}$, the engine stop controlling means 112 releases the switching clutch C0, and further decreases the engine rotation speed NE to zero (0) by the limited negative output torque of the first electric motor M1.

Herein, it is a premise that upon engagement of the switching clutch C0, the rotation speed $N_{M2}$ of the second electric motor M2 is lower than the engine rotation speed $NE_{VB}$ corresponding to the resonance point which causes the resonance phenomena. In other words, prior to the engagement of the switching clutch C0, the engine stop controlling means 112 compares the rotation speed $N_{M2}$ of the second electric motor M2 and the engine rotation speed $NE_{VB}$ corresponding to the resonance point, to thereby determine whether the rotation speed $N_{M2}$ of the second electric motor M2 is lower than the rotation speed $NE_{VB}$. If the rotation speed $N_{M2}$ being lower than the rotation speed $NE_{VB}$ is determined, the engagement of the switching clutch C0 is started.

Thus, in this embodiment, a flow chart different from the flow chart shown in FIG. 10 is used in which SA1 is omitted and one of the control steps SA5 and SA6 corresponding to the engine stop controlling means 112 is selectively executed. Executing either of the steps SA5 and SA6 can quickly decrease the engine rotation speed NE.

As described above, the engine stop controlling means 112 of this embodiment includes the means for selectively engaging the switching brake B0 and the switching clutch C0 depending on the running state of the vehicle, when limitations are imposed on the operational state of the first electric motor M1. This can quickly decreases the rotation speed NE of the engine 8. As a result, the time period required for the engine rotation speed NE to pass through the rotation speed corresponding to the resonance point can be shortened, thus suppressing the occurrence of resonance phenomena.

Although the embodiments of the present invention is described in detail with reference to the attached drawings as above, the present invention can be embodied in other modes.

For example, in the above-mentioned embodiment, both the switching brake B0 and the switching clutch C0 are engaged. However, both the switching brake B0 and the switching clutch C0 are not necessarily required to be engaged, but either of the switching brake B0 and the switching clutch C0 is engaged according to a vehicle state. For example, the switching clutch C0 may be engaged alone in the completely stopped state of the vehicle.

Additionally, in the above-mentioned embodiment, the switching clutch C0 serves to selectively connect the differential-portion sun gear S0 and the differential-portion carrier CA0. However, the switching clutch C0 is not limited to type, but can have a structure to connect arbitrary two rotary elements among the differential-portion sun gear S0, the differential-portion carrier, and the differential-portion ring gear R0. Still additionally, in the above-mentioned embodiment, one rotary element corresponds to the differential-portion sun gear S0, and two rotary elements correspond to the differential-portion sun gear S0 and the differential-portion carrier CA0. However, correspondences therebetween are not limited to this type, and can be freely modified within a non-contradictory range.

In the above-mentioned embodiment, the second electric motor M2 is connected to the power transmitting member 18 in series. However, the connecting position of the second electric motor M2 is not limited to this type, but the second electric motor M2 is directly connected to the power transmitting path between the differential portion 11 and the drive wheel, or indirectly connected thereto via a transmission or the like.

In the above-mentioned embodiment, while the differential portion 11 is configured to function as the electrically controlled continuously variable transmission in which the speed ratio $\gamma 0$ is continuously varied from the minimal value $\gamma 0_{min}$ to the maximal value $\gamma 0_{max}$, the present invention may be applied even to a case wherein the speed ratio $\gamma 0$ of the differential portion 11 is not continuously varied but pretended to vary step-by-step with the use of a differential action.

With the power distribution mechanisms 16 of the above-mentioned embodiments, the first carrier CA1 is connected to the engine 8; the first sun gear S1 is connected to the first electric motor M1; and the first ring gear R1 is connected to the power transmitting member 18. However, the present invention is not necessarily limited to such connecting arrangement, and the engine 8, first electric motor M1 and power transmitting member 18 have no objection to be connected to either one of the three elements CA1, S1 and R1 of the first planetary gear set 24.

Although the above-mentioned embodiment has been described with reference to the engine 8 directly connected to the input shaft 14, these component parts may suffice to be operatively connected via, for instance, gears, belts or the like. No need may arise for the engine 8 and the input shaft 14 to be necessarily disposed on a common axis.

Further, while the above-mentioned embodiment has been described with reference to the first electric motor M1 and the second electric motor M2 wherein the first electric motor M1 is coaxially disposed with the drive apparatus input shaft 14 and connected to the first sun gear S1 upon which the second electric motor M2 is connected to the power transmitting member 18. However, no need arises for these component parts to be necessarily placed in such connecting arrangement. For example, the first electric motor M1 may be connected to the first sun gear S1 through gears, a belt or the like, and the second electric motor M2 may be connected to the power transmitting member 18.

In the above-mentioned embodiment, further, the hydraulic-type frictionally coupling devices such as the first and second clutches C1, C2 may include magnetic type clutches such as powder (magnetic powder) clutches, electromagnetic clutches and meshing type dog clutches, and electromagnetic type and mechanical coupling devices. For instance, with the electromagnetic clutches being employed, the hydraulic control circuit 42 may not include a valve device for switching hydraulic passages and may be replaced with a switching device or electromagnetically operated switching device or the like that are operative to switch electric command signal circuits for electromagnetic clutches.

While the above-mentioned embodiment has been described above with reference to the automatic transmission portion 20 that is connected to the differential portion 11 in series via the power transmitting member 18, a countershaft may be provided in parallel to the input shaft 14 to allow the automatic transmission portion 20 to be coaxially disposed on an axis of the countershaft. In this case, the differential portion 11 and the automatic transmission portion 20 may be connected to each other in power transmitting capability via a set of transmitting members structured of, for instance, a counter-gear pair acting as the power transmitting member 18, a sprocket and a chain.

Further, the power distributing mechanism 16 as the differential mechanism of the above-mentioned embodiment may include, for instance, a differential gear set in which a pinion, rotatably driven with the engine, and a pair of bevel gears, held in meshing engagement with the pinion, are operatively connected to the first electric motor M1 and the power transmitting member 18 (second electric motor M2).

The power distributing mechanism 16 of the above-mentioned embodiment having been described above as including one set of planetary gear units, may include two or more sets of planetary gear units that are arranged to function as a transmission having three or more speed positions under a non-differential state (fixed shifting state). In addition, the planetary gear unit is not limited to the single-pinion type, but may be of a double-pinion type. Following structure can be adopted. When the power distributing mechanism 16 is comprised of two or more sets of planetary gear units, the engine 8, first and second electric motors M1 and M2, and power transmitting member 18 can be connected to each of rotary elements of the planetary gear units in the power transmissive state. Further, the step variable shifting and the continuously variable shifting state can be switched by controlling the clutch C and brake B connected to each of rotary elements of the planetary gear unit.

In the above-mentioned embodiment, although the engine 8 and the differential portion 11 are directly connected with each other, such connecting mode is not essential. The engine 8 and the differential portion 11 can be connected via the clutch etc.

In the above-mentioned embodiment, the differential portion 11 and the automatic shifting portion 20 are connected to each other in series. However, the present invention can be applied to a structure even if the differential portion 11 and the automatic shifting portion 20 are mechanically independent from each other, provided that a whole of the shifting mechanism 10 has a function to achieve an electrically controlled differential action, and a function to perform a shifting on a principle different from the function of the electrically controlled differential action. Also the connecting position and the connecting arrangement of the differential portion 11 and the automatic shifting portion 20 are not necessarily limited. Further, the present invention can be applied to the shifting mechanism which has the functions to perform an electrically controlled differential action and a shifting action, even if a part of structure is overlapping or a whole of structure is common.

In the above-mentioned embodiment, the automatic shifting position 20 selects a step-variable transmission which enables to have four speed positions. However, the gear shift position of the automatic shifting portion 20 is not limited to four speed positions, but may be to five speed positions or the like. Further, the connecting arrangement of the automatic shifting position 20 is not limited to that in the illustrated embodiment, but may be changed freely.

The foregoing merely illustrates the embodiments for illustrating the principles of the present invention. It will be appreciated by those skilled in the art that various modifications and alternatives to those details could be developed in the light of the overall teachings of the disclosure.

What is claimed is:

1. A control device for a vehicular power transmitting apparatus wherein
    the vehicular power transmitting apparatus includes (i) an electric differential portion in which, by controlling an operational state of an electric motor connected to a rotary element of a differential mechanism in a power transmissive state, a differential state between a rotation speed of an input shaft to which an internal combustion engine is connected and a rotation speed of an output shaft is controlled; and (ii) a differential state limiting device that mechanically limits a differential state of the electric differential portion;
    the control device is comprised of an engine-stop controlling portion that decreases a rotation speed of the internal combustion engine by the electric motor upon stopping the internal combustion engine, the engine-stop controlling portion limiting a differential state of the electric differential portion by the differential state limiting device when the operational state of the electric motor is limited;
    the differential state limiting device includes a first limiting device that limits the rotation of one rotary element forming the differential mechanism and a second limiting device that limits relative rotations between two rotary elements forming the differential mechanism; and
    the engine-stop controlling portion limits the differential state of the electric differential portion by simultaneously using a first differential limiting action by the first limiting device and a second differential limiting action by the second limiting device.

2. The control device for the vehicular power transmitting apparatus according to claim 1, wherein the operational state of the electric motor is limited depending on limitations imposed on charge or discharge of a battery.

3. The control device for the vehicular power transmitting apparatus according to claim 1, wherein the operational state of the electric motor is limited depending on a failed state of the electric motor.

4. The control device for the vehicular power transmitting apparatus according to claim 1, wherein the differential state limiting device locks or controls in a locking direction the electric motor and a rotary element of the differential mechanism connected to the electric motor.

5. The control device for the vehicular power transmitting apparatus according to claim 4, wherein the differential state limiting device limits the differential state of the electric differential portion by bringing a switching brake disposed between a differential-portion sun gear and a casing into an engaged state or semi-engaged state.

6. The control device for the vehicular power transmitting apparatus according to claim 4, wherein the differential state limiting device limits the differential state of the electric differential portion by bringing a switching clutch disposed between a differential-portion sun gear and a differential-portion carrier into an engaged state or semi-engaged state.

7. The control device for the vehicular power transmitting apparatus according to claim 5, wherein the differential state limiting device executes the limiting control in an extremely slow vehicle speed area where a vehicle speed is zero or nearly zero.

8. The control device for the vehicular power transmitting apparatus according to claim 6, wherein the differential state limiting device executes the limiting control in an extremely slow vehicle speed area where a vehicle speed is zero or nearly zero.

9. The control device for the vehicular power transmitting apparatus according to claim 6, wherein the limitation of the differential state of the electric differential portion by the differential state limiting device is released after stoppage of the internal combustion engine.

* * * * *